(12) United States Patent
Xue et al.

(10) Patent No.: US 12,379,546 B2
(45) Date of Patent: Aug. 5, 2025

(54) WAVELENGTH DIVISION MULTIPLEXER WITH MULTIPLE INPUTS AND OUTPUTS

(71) Applicant: II-VI Photonics, Inc., Fuzhou (CN)

(72) Inventors: Tingyu Xue, Fuzhou (CN); Yang Li, Fuzhou (CN); Wade Tang, Sunnyvale, CA (US); Lixun Chen, Fuzhou (CN); Tianguo Bo, Fuzhou (CN); Jiangming Lin, Fuzhou (CN); Wei Wu, Fuzhou (CN); Yunbing Xu, Fuzhou (CN); Cart Song, Fuzhou (CN); Yihui Wang, Fuzhou (CN)

(73) Assignee: II-VI Photonics, Inc., Fuzhou (CN)

( * ) Notice: Subject to any disclaimer, the term of this patent is extended or adjusted under 35 U.S.C. 154(b) by 346 days.

(21) Appl. No.: 18/173,259

(22) Filed: Feb. 23, 2023

(65) Prior Publication Data
US 2024/0264379 A1 Aug. 8, 2024

(30) Foreign Application Priority Data
Feb. 8, 2023 (CN) .......................... 202310085943.8

(51) Int. Cl.
G02B 6/293 (2006.01)
G02B 6/32 (2006.01)
G02B 6/35 (2006.01)
G02B 6/42 (2006.01)

(52) U.S. Cl.
CPC ....... *G02B 6/2938* (2013.01); *G02B 6/29361* (2013.01); *G02B 6/32* (2013.01); *G02B 6/3512* (2013.01); *G02B 6/4215* (2013.01)

(58) Field of Classification Search
CPC .... G02B 6/2938; G02B 6/29361; G02B 6/32; G02B 6/4215; G02B 6/2937; G02B 6/3512
See application file for complete search history.

(56) References Cited

U.S. PATENT DOCUMENTS

| | | | | | |
|---|---|---|---|---|---|
| 4,244,045 | A | * | 1/1981 | Nosu .................... | H04J 14/0307 398/91 |
| 4,482,994 | A | * | 11/1984 | Ishikawa ............ | G02B 6/29362 385/37 |
| 4,824,200 | A | * | 4/1989 | Isono ................... | G02B 6/2938 385/47 |
| 5,737,104 | A | * | 4/1998 | Lee .................... | G02B 6/29362 398/79 |

(Continued)

*Primary Examiner* — Ryan A Lepisto
*Assistant Examiner* — Erin D Chiem
(74) *Attorney, Agent, or Firm* — The Webb Law Firm

(57) ABSTRACT

A wavelength division multiplexer (WDM) includes one or more lenses, a WDM filter, and multiple common, multiple reflected and multiple transmit optical fibers optically coupled to the one or more lenses. Light at a first wavelength propagates in either direction between one common optical fiber and one reflected optical fiber via the one or more lenses and the WDM filter, wherein the WDM filter reflects the light at a first wavelength during propagation in either direction between the common optical fiber and the reflected optical fiber. Light at a second wavelength propagates in either direction between the common optical fiber and one transmit optical fiber via the one or more lenses and the WDM filter, wherein the WDM filter passes the light at a second wavelength during propagation in either direction between the common optical fiber and the transmit optical fiber.

30 Claims, 8 Drawing Sheets

(56) References Cited

U.S. PATENT DOCUMENTS

| | | | | |
|---|---|---|---|---|
| 5,790,314 | A * | 8/1998 | Duck | G02B 6/2937 |
| | | | | 385/33 |
| 5,812,291 | A * | 9/1998 | Bendelli | G02B 6/29367 |
| | | | | 398/85 |
| 6,198,857 | B1 * | 3/2001 | Grasis | G02B 6/29365 |
| | | | | 385/47 |
| 6,999,656 | B1 * | 2/2006 | He | G02B 6/29368 |
| | | | | 385/47 |
| 7,184,620 | B1 * | 2/2007 | Richard | G02B 6/29383 |
| | | | | 385/24 |
| 7,412,124 | B1 * | 8/2008 | He | G02B 6/2938 |
| | | | | 385/20 |
| 9,804,332 | B1 * | 10/2017 | Wang | G02B 6/29365 |
| 2004/0169926 | A1 * | 9/2004 | Blair | G02B 6/2746 |
| | | | | 359/489.15 |
| 2007/0147733 | A1 * | 6/2007 | Matsumura | G02B 6/32 |
| | | | | 385/34 |
| 2023/0010259 | A1 * | 1/2023 | Tanaka | G02B 6/29365 |

* cited by examiner

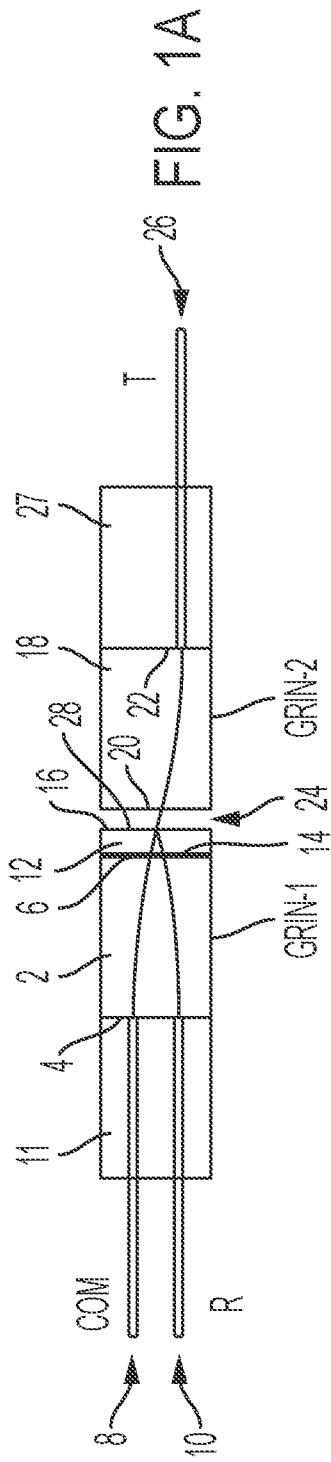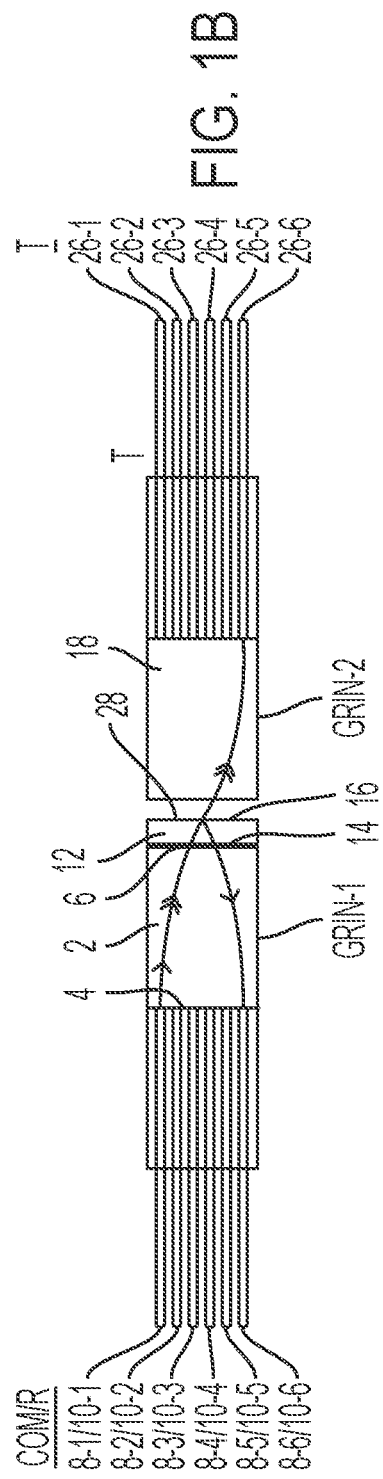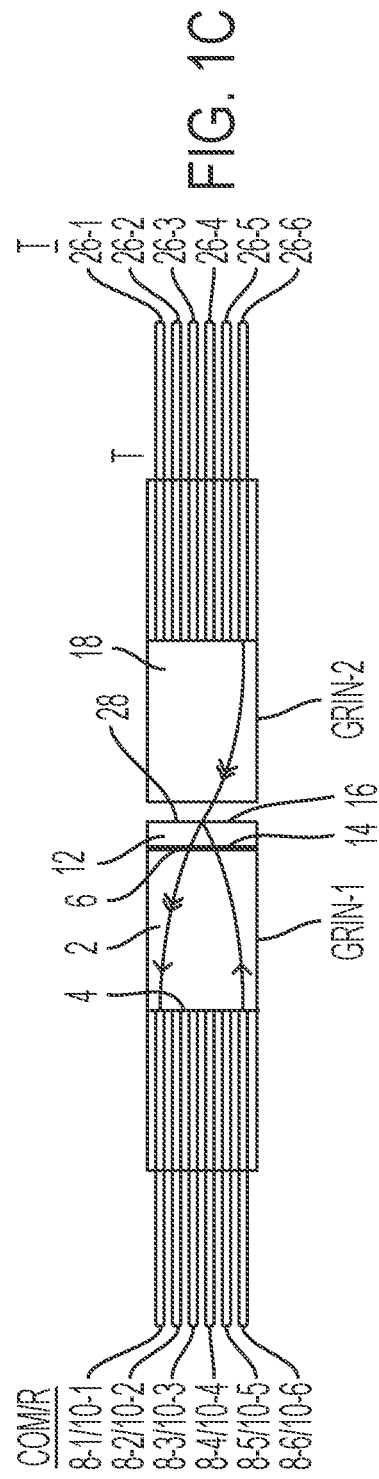

WAVELENGTH DIVISION MULTIPLEXER WITH MULTIPLE INPUTS AND OUTPUTS

BACKGROUND

1. Field

The present disclosure describes wavelength division multiplexers (WDMs). Each WDM includes multiple sets of related, associated or corresponding optical fibers and multiple sets of related, associated or corresponding ports of the WDM.

2. Description of Related Art

Heretofore, prior art passive optical communication modules integrated multiple, individual 3-port wavelength division multiplexers (WDMs) into a single package. Each 3-port WDM includes a set of ports typically referred to as a common port, a reflected port, and a transmit (or pass) port. In use, the common port is coupled to a first optical fiber typically referred to as a common (COM) optical fiber, the reflected port is coupled to a second optical fiber typically referred to as a reflected (R) optical fiber, and the transmit port is coupled to a third optical fiber typically referred to as a transmit (T) optical fiber.

In an example use or operation of such 3-port WDM, light at first and second wavelengths received at the common port via the common optical fiber can be separated by a WDM filter of the WDM whereupon the light at the first wavelength is output to the reflected optical fiber via the reflected port and the light at the second wavelength is output to the transmit optical fiber via the transmit port.

The 3-port WDM can also operate in reverse to combine the light at the first and second wavelengths. For example, light at the first wavelength received at the reflected port via the reflected fiber and light at the second wavelength received at the transmit port via the transmit optical fiber can be combined by the WDM filter of the WDM and the combination of the light at the first and second wavelengths can be output to the common optical fiber via the common port.

If only light at the first wavelength is presented to the WDM, the WDM filter can cause the light at the first wavelength to be transmitted in either one or both directions between the common port and, hence, the common optical fiber and the reflected port and, hence, the reflected optical fiber. Similarly, if only light at the second wavelength is presented to the WDM, the WDM filter can cause the light at the second wavelength to be transmitted in either one or both directions between the common port and, hence, the common optical fiber and the transmit port and, hence, the transmit optical fiber.

A drawback of such prior art passive optical communication module is low integration level and, hence, high cost.

SUMMARY

Disclosed herein is a wavelength division multiplexer (WDM) comprising lens means; a WDM filter; and a plurality of optical fiber means optically coupled to the lens means. Each optical fiber means includes a common optical fiber optically coupled to the lens means, a reflected optical fiber optically coupled to the lens means, and a transmit optical fiber optically coupled to the lens means. The lens means, the WDM filter, and each optical fiber means are configured such that: light at a first wavelength propagates in either direction between the common optical fiber and the reflected optical fiber via the lens means and the WDM filter, wherein the WDM filter reflects the light at a first wavelength during propagation in either direction between the common optical fiber and the reflected optical fiber; and light at a second wavelength propagates in either direction between the common optical fiber and the transmit optical fiber via the lens means and the WDM filter, wherein the WDM filter passes the light at a second wavelength during propagation in either direction between the common optical fiber and the transmit optical fiber.

In an example, the lens means can include a first lens and a second lens, and the WDM filter can be positioned between the first lens and the second lens. The common optical fiber and the reflected optical fiber of each optical fiber means can be positioned to input into and receive from the first lens the light at the first wavelength. The transmit optical fiber of each optical fiber means can be positioned to input into and receive from the second lens the light at the second wavelength.

In another example, each lens of the first lens and the second lens can be one of the following: (1) a gradient-index (GRIN) lens; or (2) a substrate including a plurality of spherical or aspherical lenses, wherein: light at the first wavelength propagating in either direction between the common optical fiber and the reflected optical fiber propagates through a first one of the plurality of spherical or aspherical lenses of the first lens; and light at the second wavelength propagating in either direction between the common optical fiber and the transmit optical fiber propagates through the first one of the plurality of spherical or aspherical lenses of the first lens and a first one of the plurality of spherical or aspherical lenses of the second lens.

In another example, the WDM can further include a mirror, wherein the lens means can be a gradient-index (GRIN) lens and the WDM filter can be positioned between the mirror and the GRIN lens. The common optical fiber and the reflected optical fiber of each optical fiber means can be positioned to input into and receive from the GRIN lens the light at the first wavelength which is reflected by the WDM filter during propagation in either direction between the common optical fiber and the reflected optical fiber. The transmit optical fiber of each optical fiber means can be positioned to input into and receive from the GRIN lens the light at the second wavelength which propagates through the WDM filter and is reflected by the mirror during propagation in either direction between the common optical fiber and the transmit optical fiber.

In another example, the WDM can further include a mirror and the lens means can be a substrate including a plurality of spherical or aspherical lenses. The WDM filter can be positioned between the mirror and the substrate including the plurality of spherical or aspherical lenses. Light at the first wavelength propagating in either direction between the common optical fiber and the reflected optical fiber can pass through a first one of the plurality of spherical or aspherical lenses and can be reflected by the WDM filter back through the first one of the plurality of spherical or aspherical lenses. Light at the second wavelength propagating from the common optical fiber to the transmit optical fiber propagates through the first one of the plurality of spherical or aspherical lenses, through the WDM filter, to the mirror where the light at the second wavelength is reflected back through the WDM filter through a second one of the plurality of spherical or aspherical lenses. Light at the second wavelength propagating from the transmit optical fiber to the common optical fiber propagates through the second one of the plurality of spherical or aspherical lenses, through the WDM filter, to the mirror where the light at the second wavelength is reflected back through the WDM filter through the first one of the plurality of spherical or aspherical lenses.

Also disclosed herein is a wavelength division multiplexer (WDM) comprising: a first gradient-index (GRIN-1) lens including first and second surfaces on opposite sides or ends of the GRIN-1 lens. A first plurality or array of common optical fibers are each positioned to input light into the first surface of the GRIN-1 lens and to receive light from the first surface of the GRIN-1 lens. A second plurality or array of reflected optical fibers are each positioned to input light into the first surface of the GRIN-1 lens and to receive light from the first surface of the GRIN-1 lens. A WDM filter includes first and second surfaces on opposite sides or ends of the WDM filter. The first surface of the WDM filter is coupled to the second surface of the GRIN-1 lens. A second gradient-index (GRIN-2) lens includes first and second surfaces on opposite sides or ends of the GRIN-2 lens. The first surface of the GRIN-2 lens and the second surface of the WDM filter are spaced from each other by a gap. A third plurality or array of transmit optical fibers are each positioned to input light into the second surface of the GRIN-2 lens and to receive light from the second surface of the GRIN-2 lens. Light having first and second wavelengths output by each common optical fiber propagates through the GRIN-1 lens to the WDM filter which: (1) reflects the light of the first wavelength back through the GRIN-1 lens to a unique one of the reflected optical fibers but to no other optical fiber of the array of reflected optical fibers, the array of transmit optical fibers, and the array of common optical fibers; and (2) passes the light of the second wavelength through the gap and the GRIN-2 lens to a unique one of the transmit optical fibers but to no other optical fiber of the array of transmit optical fibers, the array of reflected optical fibers, and the array of common optical fibers.

The first and second surfaces of each GRIN lens disclosed herein may be flat.

Also disclosed herein is a wavelength division multiplexer (WDM) comprising a gradient-index (GRIN) lens including first and second surfaces on opposite sides or ends of the GRIN lens. A first plurality or array of common optical fibers are each positioned to input light into the first surface of the GRIN lens and to receive light from the first surface of the GRIN lens. A second plurality or array of reflected optical fibers are each positioned to input light into the first surface of the GRIN lens and to receive light from the first surface of the GRIN lens. A third plurality or array of transmit optical fibers, are each positioned to input light into the first surface of the GRIN lens and to receive light from the first surface of the GRIN lens. A WDM filter includes first and second surfaces on opposite sides or ends of the WDM filter, the first surface of the WDM filter is coupled to the second surface of the GRIN lens and a mirror is coupled to the second surface of the WDM filter. Light having first and second wavelengths output by each common optical fiber propagates through the GRIN lens to the WDM filter which: (1) reflects the light of the first wavelength back through the GRIN lens to a unique one of the reflected optical fibers but to no other optical fiber of the array of reflected optical fibers, the array of transmit optical fibers, and the array of common optical fibers, and (2) passes the light of the second wavelength to the mirror which reflects the light of the second wavelength back through the WDM filter and the GRIN lens to a unique one of the transmit optical fibers but to no other optical fiber of the array of transmit optical fibers, the array of reflected optical fibers, and the array of common optical fibers.

Also disclosed herein is a wavelength division multiplexer (WDM) comprising: a WDM filter; a first lens array comprising a first substrate including a plurality of spherical or aspherical lenses positioned on a first side of the WDM filter; and a second lens array comprising a second substrate including a plurality of spherical or aspherical lenses positioned on a second side of the WDM filter. Each spherical or aspherical lens of the first and second lens arrays includes a rounded, spherical or aspherical surface facing the WDM filter. The WDM also includes a first plurality or array of common optical fibers, each positioned to input light into one spherical or aspherical lens of the first lens array and to receive light from the one spherical or aspherical lens of the first lens array; a second plurality or array of reflected optical fibers, each positioned to input light into one spherical or aspherical lens of the first lens array and to receive light from the one spherical or aspherical lens of the first lens array, and a third plurality or array of transmit optical fibers, each positioned to input light into one spherical or aspherical lens of the second lens array and to receive light from the one spherical or aspherical lens of the second lens array. In operation of the WDM, light having first and second wavelengths output by each common optical fiber propagates through one spherical or aspherical lens of the first lens array to the WDM filter which: (1) reflects the light of the first wavelength back through the one spherical or aspherical lens of the first lens array to the reflected optical fiber positioned to receive light from the one spherical or aspherical lens of the first lens array but to no other optical fiber of the array of reflected optical fibers, the array of transmit optical fibers, and the array of common optical fibers, and (2) passes the light of the second wavelength through one spherical or aspherical lens of the second lens array to a unique one of the transmit optical fibers but to no other optical fiber of the array of transmit optical fibers, the array of reflected optical fibers, and the array of common optical fibers.

Also disclosed herein is a wavelength division multiplexer (WDM) comprising a WDM filter; an optical fiber array including a first plurality or array of common optical fibers, a second plurality or array of reflected optical fibers, and a third plurality or array of transmit optical fibers. A lens array comprising a substrate including a plurality of spherical or aspherical lenses is positioned on a first side of the WDM filter, wherein each spherical or aspherical lens includes a rounded, spherical or aspherical surface facing the WDM filter. Each spherical or aspherical lens of a first subset of the spherical or aspherical lenses has associated therewith a unique common—reflected optical fiber pair, each of which optical fiber of said unique optical fiber pair is positioned to input light into and to receive light from the spherical or aspherical lens of the first subset of the spherical or aspherical lenses. Each spherical or aspherical lens of a second subset of the spherical or aspherical lenses has associated therewith at least one unique transmit optical fiber positioned to input light into the spherical or aspherical lens of the second subset of the spherical or aspherical lenses and to receive light from the spherical or aspherical lens of the second subset of the spherical or aspherical lenses. A mirror is positioned on a second side of the WDM filter. Light having first and second wavelengths output by each common optical fiber propagates through one spherical or aspherical lens of the first subset of spherical or aspherical lenses to the WDM filter which (1) reflects the light of the first wavelength back through the one spherical or aspherical lens of the first subset of spherical or aspherical lenses to the reflected optical fiber positioned to receive light from the one spherical or aspherical lens of the first subset of spherical or aspherical lenses but to no other optical fiber of the array of reflected optical fibers, the array of transmit optical fibers, and the array of common optical fibers, and (2) passes the light of the second wavelength to the mirror which reflects the light of the second wavelength back through the WDM filter to one spherical or aspherical lens of the second subset of spherical or aspherical lenses and to the at least one unique transmit optical fiber positioned to receive light from the one spherical or aspherical lens of the second subset of the spherical or aspherical lenses but to no other optical fiber of the array of transmit optical fibers, the array of reflected optical fibers, and the array of common optical fibers.

Also disclosed herein is a wavelength division multiplexer (WDM) comprising a WDM filter and an optical fiber array including a first plurality or array of common optical fibers, a second plurality or array of reflected optical fibers, and a third plurality or array of transmit optical fibers. A lens array comprising a substrate including a plurality of spherical or aspherical lenses is positioned on a first side of the WDM filter. Each spherical or aspherical lens includes a rounded, spherical or aspherical surface facing the WDM filter. Each spherical or aspherical lens is associated with a unique common—reflected—transmit optical fiber set. Each optical fiber of each optical fiber set is positioned to input light into and receive light from the associated spherical or aspherical lens. A mirror is positioned on a second side of the WDM filter. Light having first and second wavelengths output by the common optical fiber of each optical fiber set propagates through the associated spherical or aspherical lens to the WDM filter which: (1) reflects the light of the first wavelength back through the associated spherical or aspherical lens to the reflected optical fiber of the optical fiber set, and (2) passes the light of the second wavelength to the mirror which reflects the light of the second wavelength back through the WDM filter and the associated spherical or aspherical lens to the transmit optical fiber of the optical fiber set.

Also disclosed herein is a wavelength division multiplexer (WDM) comprising a WDM filter and an optical fiber array that includes a first plurality or array of common optical fibers, a second plurality or array of reflected optical fibers, and a third plurality or array of transmit optical fibers. A lens array including a substrate including a plurality of spherical or aspherical lenses is positioned on a first side of the WDM filter. Each spherical or aspherical lens includes a rounded, spherical or aspherical surface facing the WDM filter. Each spherical or aspherical lens is associated with a unique common—reflected—transmit optical fiber set, each of which optical fiber of said unique optical fiber set is positioned to input light into and receive light from the associated spherical or aspherical lens. A mirror is positioned on a second side of the WDM filter. Light having first and second wavelengths output by the common optical fiber of each optical fiber set propagates through the associated spherical or aspherical lens to the WDM filter which: (1) reflects the light of the first wavelength back through the associated spherical or aspherical lens to the reflected optical fiber of the optical fiber set, and (2) passes the light of the second wavelength to the mirror which reflects the light of the second wavelength back through the WDM filter and the associated spherical or aspherical lens to the transmit optical fiber of the optical fiber set.

BRIEF DESCRIPTION OF THE DRAWING(S)

FIG. 1A is a schematic end view of an example wavelength division multiplexer (WDM) including a WDM filter between a pair GRIN lenses;

FIG. 1B is a schematic top view of the WDM of FIG. 1A illustrating how light at first and second wavelengths propagate from a common (COM) optical fiber to a reflected (R) optical fiber and a transmit (T) optical fiber;

FIG. 1C is the schematic top view of the WDM of FIG. 1A illustrating how light at first and second wavelengths propagate from the reflected (R) optical fiber and the transmit (T) optical fiber to the common (COM) optical fiber;

DESCRIPTION

Figure 2A:
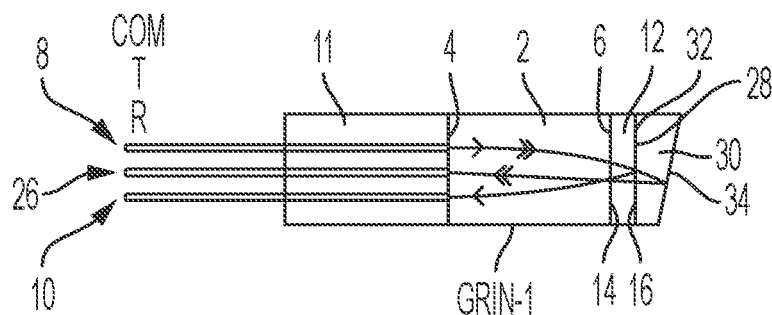
FIG. 2A is a schematic end view of an example WDM including a WDM filter between a GRIN lens and a mirror illustrating how light at first and second wavelengths propagate from a common (COM) optical fiber to a reflected (R) optical fiber and a transmit (T) optical fiber.

Various non-limiting examples will now be described with reference to the accompanying figures where like reference numbers correspond to like or functionally equivalent elements.

For purposes of the description hereinafter, terms like "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example (s) illustrated in the attached drawings, and described in the following specification, are simply exemplary examples or aspects of the disclosure. Hence, the specific examples or aspects disclosed herein are not to be construed as limiting.

With reference to FIGS. 1A-1C, in some non-limiting embodiments or examples, a wavelength division multiplexer (WDM) in accordance with the principles of the present disclosure may include a first gradient-index (GRIN-1) lens 2 including a first surface 4 and a second surface 6 on opposite sides or ends of the GRIN-1 lens 2. A first plurality or array of common optical fibers 8 is positioned to input light into the first surface 4 of the GRIN-1 lens 2 and to receive light from the first surface 4 of the GRIN-1 lens. A second plurality or array of reflected optical fibers 10 is also positioned to input light into the first surface 4 of the GRIN-1 lens 2 and to receive light from the first surface 4 of the GRIN-1 lens 2. The first and second plurality or arrays of common optical fibers 8 and reflected optical fibers 10 may be held in operative relation to the first surface 4 of the first gradient-index GRIN-1 lens 2 by a first connector 11 which may be spaced from or coupled to the first surface 4 of the first gradient-index GRIN-1 lens 2.

A WDM filter 12 includes a first surface 14 and a second surface 16 on opposite sides or ends of the WDM filter 12. The first surface 14 of the WDM filter 12 is coupled to the second surface 6 of the GRIN-1 lens 2. The second surface 16 of the WDM filter 12 includes a film or coating 28, in the nature of a diffraction grating, which interacts with light of different wavelengths in a manner known in the art and described hereinafter.

A second gradient-index (GRIN-2) lens 18 includes a first surface 20 and a second surface 22 on opposite sides or ends of the GRIN-2 lens. The first surface 20 of the GRIN-2 lens 18 and the second surface 16 of the WDM filter 12 are spaced from each other by a gap 24. A third plurality or array of transmit optical fibers 26 is positioned to input light into the second surface 22 of the GRIN-2 lens 18 and to receive light from the second surface 22 of the GRIN-2 lens 18. The third plurality or array of transmit optical fibers 26 may be held in operative relation to the second surface 22 of the second gradient-index GRIN-2 lens 18 by a second connector 27 which may be spaced from or coupled to the second surface 22 of the second gradient-index GRIN-2 lens 18.

For simplicity, herein the figures refer generically to common optical fibers 8 or the array of common optical fibers 8 as "COM", refer to reflected optical fibers 10 or the array of reflected optical fibers 10 as "R", and refer to transmit optical fibers 26 or the array of transmit optical fibers 26 as "T".

The example WDM of FIGS. 1A-1C includes six common optical fibers 8-1-8-6, six reflected optical fibers 10-1-10-6, and six transmit optical fibers 26-1-26-6. However, this is not to be construed in a limiting sense since it is envisioned that each plurality or array of optical fibers 8, 10, and/or 26 may include any number of optical fibers between 2 and 100 as may deemed suitable and/or desirable for a particular application. In FIGS. 1B-1C, the reflected optical fibers 10-1-10-6 are positioned below the common optical fibers 8-1-8-6 (as shown in FIG. 1A) for the purpose of illustration and not of limitation.

In use or operation of the WDM of FIGS. 1A-1C, light having first and second wavelengths output by each common optical fiber 8 propagates through the GRIN-1 lens 2 to the WDM filter 12 where the film or coating 28: (1) reflects the light of the first wavelength back through the GRIN-1 lens 2 to a unique one of the reflected optical fibers 10 but to no other optical fiber of the array of reflected optical fibers, the array of transmit optical fibers, and the array of common optical fibers; and (2) passes the light of the second wavelength through the gap 24 and the GRIN-2 lens 18 to a unique one of the transmit optical fibers 26 but to no other optical fiber of the array of transmit optical fibers, the array of reflected transmit optical fibers, and the array of common optical fibers.

In an example shown in FIG. 1B, light at the first wavelength (shown by single arrow heads ">") output by common optical fiber 8-1 propagates through GRIN-1 lens 2 to the WDM filter 12 where the film or coating 28 reflects the light of the first wavelength back through GRIN-1 lens 2 to reflected optical fiber 10-6. As is also shown in FIG. 1B, light at the second wavelength (shown by double arrow heads ">>") output by common optical fiber 8-1 propagates through the GRIN-1 lens 2, the WDM filter 12, including the film or coating 28, the gap 24, and the GRIN-2 lens 18 to transmit optical fiber 26-6.

In a reciprocal manner shown in FIG. 1C, light at the first wavelength output by the reflected optical fiber 10-6 propagates through GRIN-1 lens 2 and is reflected by the film or coating 28 of the WDM filter 12 back through GRIN-1 lens 2 to common optical fiber 8-1. Also, light at the second wavelength output by transmit optical fiber 26-6 propagates through GRIN-2 lens 18, gap 24, the WDM filter 12, including the film or coating 28, and GRIN-1 lens 2 to common optical fiber 8-1.

In an example, GRIN-1 lens 2 and the WDM filter 12, including the film or coating 28, are configured to propagate light at the first wavelength (shown by single arrow heads ">") in either direction between common optical fibers 8 and reflected optical fibers 10 as follows:

First Wavelength:
   common optical fiber 8-1/reflected optical fiber 10-6;
   common optical fiber 8-2/reflected optical fiber 10-5;
   common optical fiber 8-3/reflected optical fiber 10-4;
   common optical fiber 8-4/reflected optical fiber 10-3;
   common optical fiber 8-5/reflected optical fiber 10-2; and
   common optical fiber 8-6/reflected optical fiber 10-1.

In an example, GRIN-1 lens 2, WDM filter 12, including the film or coating 28, the gap 24, and GRIN-2 lens 18 are configured to propagate light at the second wavelength (shown by double arrow heads ">>") in either direction between common optical fibers 8 and transmit optical fibers 26 as follows:

Second Wavelength
   common optical fiber 8-1/transmit optical fiber 26-6;
   common optical fiber 8-2/transmit optical fiber 26-5;
   common optical fiber 8-3/transmit optical fiber 26-4;
   common optical fiber 8-4/transmit optical fiber 26-3;
   common optical fiber 8-5/transmit optical fiber 26-2; and
   common optical fiber 8-6/transmit optical fiber 26-1.

In an example, the WDM filter 12 may be comprised of a flat surface glass including the film or coating 28, in the nature of a diffraction grating, that reflects the light of the first wavelength and passes the light of the second wavelength. In an example, the end surface of at least one of the optical fibers, the first surface of the GRIN-1 lens and the second surface of the GRIN-2 lens may be positioned at an angle relative to a cross-section of the WDM to avoid light reflection. In an example, this angle may be between 5 and 10 degrees. In general, smaller (larger) diameters of GRIN-1 and GRIN-2 lenses 2 and 18 may be used with smaller (longer) lengths of gap 24, the length of which is selected to facilitate the propagation light at the second wavelength (shown by double arrow heads ">>") in either direction between common optical fibers 8 and transmit optical fibers 26 in the manner described above. In an example, a length of gap 24 may be between 1-10 mm, or between 2-3 mm, or may be 1.8 mm.

Figure 2B:
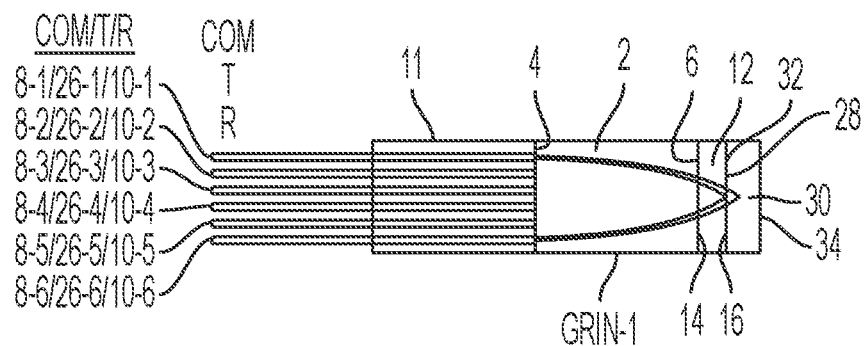
FIG. 2B is a schematic top view of the WDM of FIG. 2A.
Figure 2C:
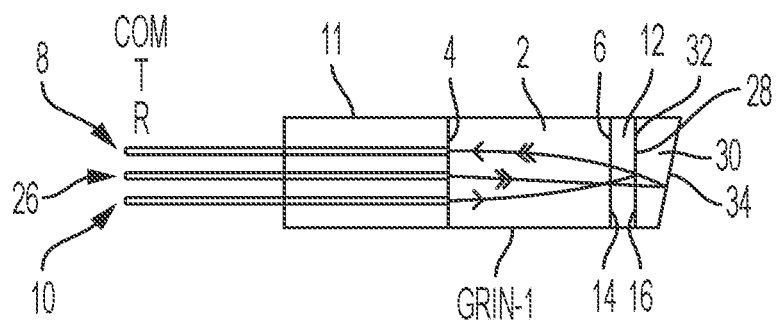
FIG. 2C is the schematic end view of the example WDM of FIG. 2A illustrating how light at first and second wavelengths propagate from the reflected (R) optical fiber and the transmit (T) optical fiber to the common (COM) optical fiber.

With reference to FIGS. 2A-2C, in some non-limiting embodiments or examples, a WDM in accordance with the principles of the present disclosure may include a single gradient-index (GRIN-1) lens 2 including first surface 4 and second surface 6 on opposite sides or ends of the GRIN-1 lens 2.

The WDM of FIGS. 2A-2C, includes first, second, and third pluralities or arrays of common optical fibers 8, reflected optical fibers 10, and transmit optical fibers 26, wherein each optical fiber is positioned to input light into the first surface 4 of the GRIN-1 lens 2 and to receive light from the first surface 4 of the GRIN-1 lens 2. The first, second, and third plurality or arrays of optical fibers 8, 10, and 26 may be held in position relative to the first surface 4 of the first gradient-index GRIN-1 lens 2 by a connector 11 which may be spaced from or coupled to the first surface 4 of the first gradient-index GRIN-1 lens 2. In FIG. 2B, the reflected optical fibers 10-1-10-6 are positioned below the transmit optical fibers 26-1-26-6, which, in-turn, are positioned below the common optical fibers 8-1-8-6 for the purpose of illustration and not of limitation. This is shown more clearly in FIGS. 2A and 2C.

A WDM filter 12 includes a first surface 14 and a second surface 16 on opposite sides or ends of the WDM filter 12. The first surface 14 of the WDM filter 12 is coupled to the second surface 6 of the GRIN-1 lens 2. The second surface 16 of the WDM filter 12 includes a film or coating 28, in the nature of a diffraction grating, which interacts with light of different wavelengths in a manner known in the art and described hereinafter.

A mirror 30 has a first, non-reflective, surface or side 32 coupled to the second surface 16 of the WDM filter 12 with the film or coating 28 positioned between a body of the WDM filter 12 and the first surface or side 32 of mirror 30. In an example, a second, reflective, side or surface 34 of mirror 30 may be positioned at an angle with respect to the first surface 32 of mirror 30. In an example, mirror 30 may be a wedge mirror, i.e., in the shape of a wedge, as shown best in FIGS. 2A and 2C.

In use or operation of the WDM of FIGS. 2A-2C, light having first and second wavelengths output by each common optical fiber 8 propagates through the GRIN-1 lens 2 to the WDM filter 12 where the film or coating 28: (1) reflects the light of the first wavelength back through the GRIN-1 lens 2 to a unique one of the reflected optical fibers 10 but to no other optical fiber of the array of reflected optical fibers, the array of transmit optical fibers, and the array of common optical fibers; and (2) passes to the mirror 30 the light of the second wavelength which passes through the first surface 32 and the body of mirror 30 to the reflective surface 34 which reflects the light of the second wavelength back through the body and the first surface 32 of mirror 30, the WDM filter 12, including the film or coating 28, and the GRIN-1 lens 2 to a unique one of the transmit optical fibers 26 but to no other optical fiber of the array of transmit optical fibers, the array of reflected optical fibers, and the array of common optical fibers.

In an example shown in FIG. 2A-2B, light at the first wavelength (shown by single arrow heads ">") output by common optical fiber 8-1 propagates through GRIN-1 lens 2 to the WDM filter 12 where the film or coating 28 reflects the light of the first wavelength back through GRIN-1 lens 2 to reflected optical fiber 10-6. As is also shown in FIG. 2A-2B, light at the second wavelength (shown by double arrow heads ">>") output by common optical fiber 8-1 propagates through the GRIN-1 lens 2, the WDM filter 12, including the film or coating 28, and the body of mirror 30 for reflection by the reflective surface 34 of mirror 30 back through the body of mirror 30, the WDM filter 12, the film or coating 28, and the GRIN-1 lens 2 to transmit optical fiber 26-6.

In a reciprocal manner shown in FIG. 2C, light at the first wavelength (shown by single arrow heads ">") output by the reflected optical fiber 10-6 propagates through GRIN-1 lens 2 and is reflected by the film or coating 28 of the WDM filter 12 back through GRIN-1 lens 2 to common optical fiber 8-1. Also, light at the second wavelength (shown by double arrow heads ">") output by transmit optical fiber 26-6 propagates through GRIN-1 lens 2, WDM filter 12, including the film or coating 28, and the body of mirror 30 for reflection by the reflective surface 34 of mirror 30 back through the body of mirror 30, the WDM filter 12, including the film or coating 28, and the GRIN-1 lens 2 to common optical fiber 8-1.

In an example, GRIN-1 lens 2 and the WDM filter 12, including the film or coating 28, are configured to propagate light at the first wavelength (shown by single arrow heads ">") in either direction between common optical fibers 8 and reflected optical fibers 10 as follows:

First Wavelength:
   common optical fiber 8-1/reflected optical fiber 10-6;
   common optical fiber 8-2/reflected optical fiber 10-5;
   common optical fiber 8-3/reflected optical fiber 10-4;
   common optical fiber 8-4/reflected optical fiber 10-3;
   common optical fiber 8-5/reflected optical fiber 10-2; and
   common optical fiber 8-6/reflected optical fiber 10-1.

In an example, GRIN-1 lens 2, WDM filter 12, including the film or coating 28, and mirror 30 are configured to propagate light at the second wavelength (shown by double arrow heads ">>") in either direction between common optical fibers 8 and transmit optical fibers 26 as follows:

Second Wavelength
   common optical fiber 8-1/transmit optical fiber 26-6;
   common optical fiber 8-2/transmit optical fiber 26-5;
   common optical fiber 8-3/transmit optical fiber 26-4;
   common optical fiber 8-4/transmit optical fiber 26-3;

common optical fiber 8-5/transmit optical fiber 26-2; and common optical fiber 8-6/transmit optical fiber 26-1.

In an example, the WDM filter 12 may be comprised of a flat surface glass including the film or coating 28, in the nature of a diffraction grating, that reflects the light of the first wavelength and passes the light of the second wavelength. In an example, the end surface of at least one optical fiber, preferably all of the optical fibers, and the first surface 4 of the GRIN-1 lens 2 may be positioned at an angle relative to a cross-section of the WDM to avoid light reflection. In an example, this angle may be between 5 and 10 degrees. Finally, it is believed that a shorter distance between the reflective surface 34 of mirror 30 and the second surface 16 or film or coating 28 of the WDM filter 12 is more desirable than a longer distance. However, this is not to be construed in a limiting sense.

Figure 3A:
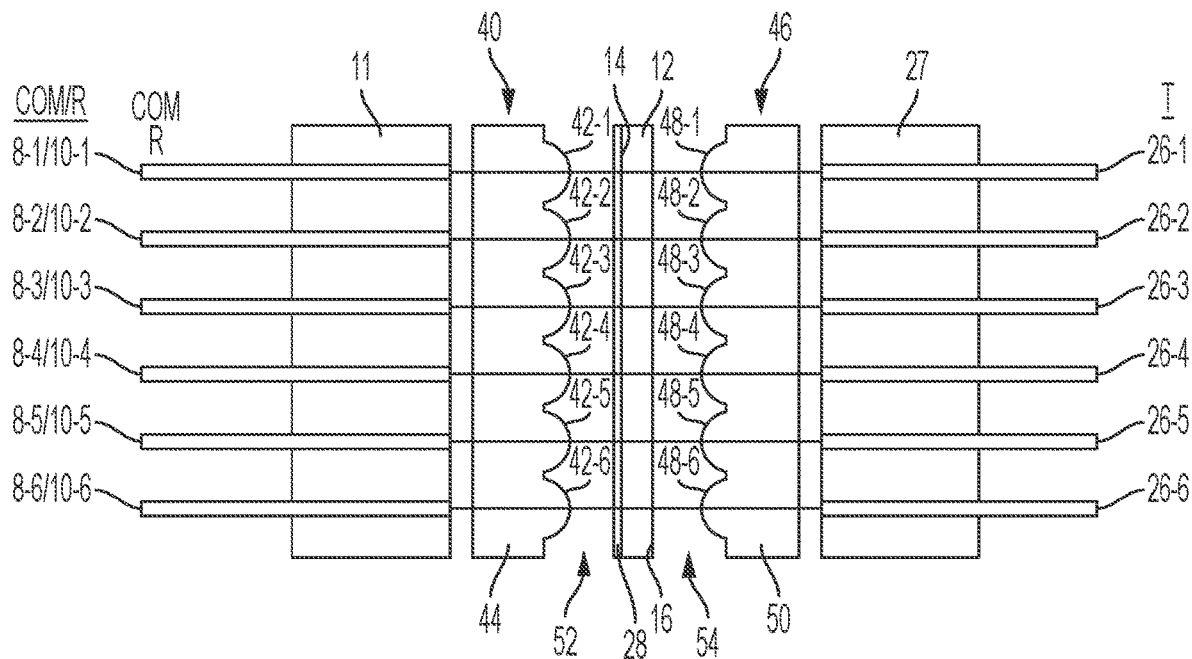
FIG. 3A is a schematic top view of an example WDM including a WDM filter between a pair of lens arrays, wherein each lens array includes a substrate having a number of spherical or aspherical lenses.
Figure 3B:
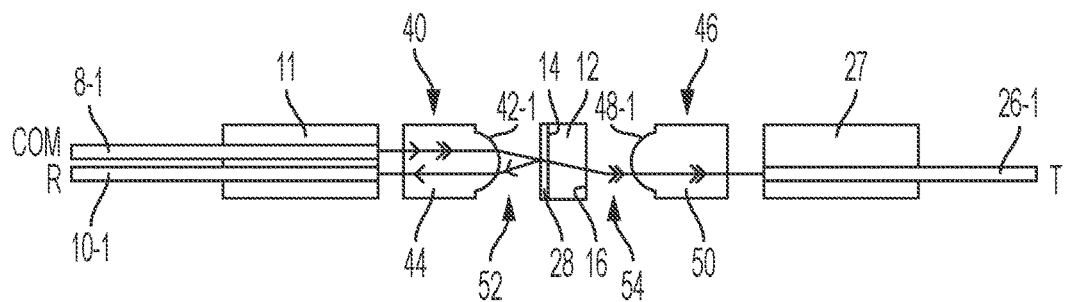
FIG. 3B is a schematic end view of the WDM of FIG. 3A illustrating how light at first and second wavelengths propagate through lenses of the pair of lens arrays from a common (COM) optical fiber to a reflected (R) optical fiber and a transmit (T) optical fiber.
Figure 3C:
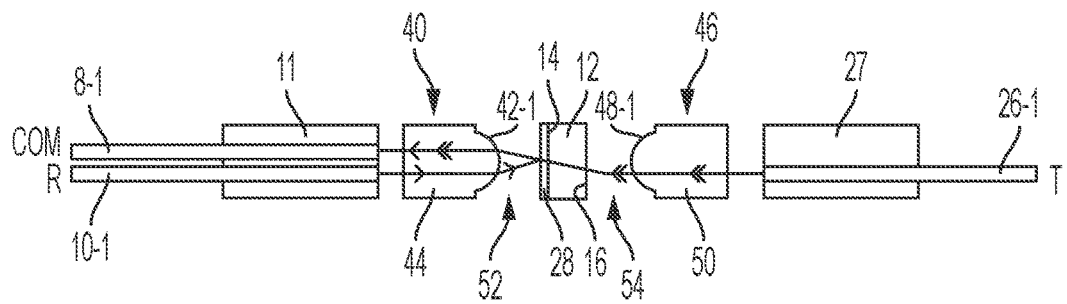
FIG. 3C is a schematic end view of the WDM of FIG. 3A illustrating how light at first and second wavelengths propagate through the lenses of the pair of lens arrays from the reflected (R) optical fiber and the transmit (T) optical fiber to the common (COM) optical fiber.

With reference to FIGS. 3A-3C, in some non-limiting embodiments or examples, a WDM in accordance with the principles of the present disclosure may include a WDM filter 12 including a film or coating 28, in the nature of a diffraction grating, a first lens array 40 comprising a first substrate 44 including a plurality of spherical or aspherical lenses 42 positioned on a first side of the WDM filter 12, and a second lens array 46 comprising a second substrate 50 including a plurality of spherical or aspherical lenses 48 on a second side of the WDM filter 12. The spherical or aspherical lenses 42, 48 of the first and second lens arrays 40, 46 are positioned with rounded, spherical or aspherical surfaces of the spherical or aspherical lenses 42, 48 facing the WDM filter 12.

In a manner known in the art, each rounded, spherical or aspherical surface of each spherical or aspherical lens described herein may bend light by refraction as light waves propagate at an angle through the rounded, spherical or aspherical surface between one medium and another (e.g., the material forming the spherical or aspherical lens and the surrounding environment or air, or vice versa). As is known in the art, a light wave that propagates perpendicular through the rounded, spherical or aspherical surface may pass therethrough without bending.

In an example, first lens array 40 and WDM filter 12 may be separated by a first gap 52 and second lens array 46 and WDM filter 12 may be separated by a second gap 54. The length of each gap 52 and 54 may be selected as needed to facilitate the operation of the WDM of FIGS. 3A-3C in the manner described hereinafter.

A first plurality or array of common optical fibers 8 are each positioned to input light into one spherical or aspherical lens 42 of the first lens array 40 and to receive light from the one spherical or aspherical lens 42 of the first lens array 40. A second plurality or array of reflected optical fibers 10 are each positioned to input light into one spherical or aspherical lens 42 of the first lens array 40 and to receive light from the one spherical or aspherical lens 42 of the first lens array 40. A third plurality or array of transmit optical fibers 26 are each positioned to input light into one spherical or aspherical lens 48 of the second lens array 46 and to receive light from the one spherical or aspherical lens 48 of the second lens array 46.

A first connector 11 supporting the common and reflected optical fibers 8 and 10 in operative relation to first lens array 40 may be spaced from or coupled to a side of the first substrate 44 opposite the plurality of spherical or aspherical lenses 42. A second connector 27 supporting the transmit optical fibers 27 in operative relation to second lens array 46 may be spaced from or coupled to a side of the second substrate 50 opposite the plurality of spherical or aspherical lenses 48 of the second lens arrays 46.

In an example, each common optical fiber 8 and each reflected optical fiber 10 are positioned to input and receive light from each spherical or aspherical lens 42 as follows:

| Common Optical Fiber | Reflected Optical Fiber | Spherical or Aspherical-lens |
|---|---|---|
| 8-1 | 10-1 | 42-1; |
| 8-2 | 10-2 | 42-2; |
| 8-3 | 10-3 | 42-3; |
| 8-4 | 10-4 | 42-4; |
| 8-5 | 10-5 | 42-5; and |
| 8-6 | 10-6 | 42-6. |

In an example, each transmit optical fiber 26 is positioned to input and receive light from each spherical or aspherical lens 48 as follows:

| Transmit Optical Fiber | Spherical or Aspherical-lens |
|---|---|
| 26-1 | 48-1; |
| 26-2 | 48-2; |
| 26-3 | 48-3; |
| 26-4 | 48-4; |
| 26-5 | 48-5; and |
| 26-6 | 48-6. |

The example WDM of FIGS. 3A-3C includes six common optical fibers 8-1-8-6, six reflected optical fibers 10-1-10-6, six transmit optical fibers 26-1-26-6, six spherical or aspherical lenses 42, and six spherical or aspherical lenses 44. However, this is not to be construed in a limiting sense since the number of optical fibers 8, 10, and/or 26 of each array and the number of spherical or aspherical lenses 42, 44 may include any number deemed suitable and/or desirable for a particular application. In FIG. 3A, the reflected optical fibers 10-1-10-6 are positioned below the common optical fibers 8-1-8-6, as shown best in FIGS. 3B-3C, for the purpose of illustration and not of limitation.

Moreover, the illustration of spherical or aspherical lenses 42 and 44 each being a linear array is not to be construed in a limiting sense since it is envisioned that spherical or aspherical lenses 42 and/or 44 can be arranged in any suitable and/or desirable manner for a particular application.

The use or operation of the WDM of FIGS. 3A-3C will now be described with reference to related, associated or corresponding optical fibers 8, 10, and 26 and related, associated or corresponding spherical or aspherical lenses 42 and 44. In FIGS. 3A-3C related, associated or corresponding optical fibers and related, associated or corresponding spherical or aspherical lenses are denoted by the same numerical suffix, e.g., -1, -2, -3, -4, etc.

In use or operation of the WDM of FIGS. 3A-3C, light having first and second wavelengths output by each common optical fiber 8 propagates through one spherical or aspherical lens 42 to the WDM filter 12 where the film or coating 28: (1) reflects the light of the first wavelength back through the one spherical or aspherical lens 42 to the reflected optical fiber 10 positioned to receive light from the one spherical or aspherical lens 42 but to no other optical fiber of the array of reflected optical fibers, the array of transmit optical fibers, and the array of common optical fibers, and (2) passes the light of the second wavelength through one spherical or aspherical lens 48 to the transmit optical fiber 26 positioned to receive light from the one spherical or aspherical lens 48 but to no other optical fiber of the array of transmit optical fibers, the array of reflected optical fibers, and the array of common optical fibers.

In an example shown in FIG. 3B, light at the first wavelength (shown by single arrow heads ">") output by common optical fiber 8-1 propagates through spherical or aspherical lens 42-1 to the WDM filter 12 where the film or coating 28 reflects the light of the first wavelength back through spherical or aspherical lens 42-1 to the reflected optical fiber 10-1. As is also shown in FIG. 3B, light at the second wavelength (shown by double arrow heads ">>") output by common optical fiber 8-1 propagates through the spherical or aspherical lens 42-1, the WDM filter 12, including the film or coating 28, and the spherical or aspherical lens 48-1 to transmit optical fiber 26-1.

In a reciprocal manner shown in FIG. 3C, light at the first wavelength output by the reflected optical fiber 10-1 propagates through spherical or aspherical lens 42-1 and is reflected by the film or coating 28 of the WDM filter 12 back through spherical or aspherical lens 42-1 to common optical fiber 8-1. Also, light at the second wavelength output by transmit optical fiber 26-1 propagates through spherical or aspherical lens 48-1, the WDM filter 12, including the film or coating 28, and spherical or aspherical lens 42-1 to common optical fiber 8-1.

In an example, spherical or aspherical lenses 42 and WDM filter 12, including the film or coating 28, are configured to direct light at the first wavelength (shown by single arrow heads ">") in either direction between related, associated or corresponding common optical fiber 8 and reflected optical fiber 10 as follows:

First Wavelength:
common optical fiber 8-1/reflected optical fiber 10-1/ spherical or aspherical lens 42-1;
common optical fiber 8-2/reflected optical fiber 10-2/ spherical or aspherical lens 42-2;
common optical fiber 8-3/reflected optical fiber 10-3/ spherical or aspherical lens 42-3;
common optical fiber 8-4/reflected optical fiber 10-4/ spherical or aspherical lens 42-4;
common optical fiber 8-5/reflected optical fiber 10-5/ spherical or aspherical lens 42-5; and
common optical fiber 8-6/reflected optical fiber 10-6/ spherical or aspherical lens 42-6.

In an example, each spherical or aspherical lens 42, WDM filter 12, including the film or coating 28, and each spherical or aspherical lens 48 are configured to direct light at the second wavelength (shown by double arrow heads ">>") in either direction between related, associated or corresponding common optical fibers 8 and transmit optical fibers 26 as follows:

Second Wavelength common optical fiber 8-1/transmit optical fiber 26-1/spherical or aspherical lenses 42-1 and 48-1;
common optical fiber 8-2/transmit optical fiber 26-2/ spherical or aspherical lenses 42-2 and 48-2;
common optical fiber 8-3/transmit optical fiber 26-3/ spherical or aspherical lenses 42-3 and 48-3;
common optical fiber 8-4/transmit optical fiber 26-4/ spherical or aspherical lenses 42-4 and 48-4;
common optical fiber 8-5/transmit optical fiber 26-5/ spherical or aspherical lenses 42-5 and 48-5; and
common optical fiber 8-6/transmit optical fiber 26-6/ spherical or aspherical lenses 42-6 and 48-6.

In an example, the WDM filter 12 may be comprised of a flat surface glass including the film or coating 28, in the nature of a diffraction grating, that reflects the light of the first wavelength and passes the light of the second wavelength.

Figure 4A:
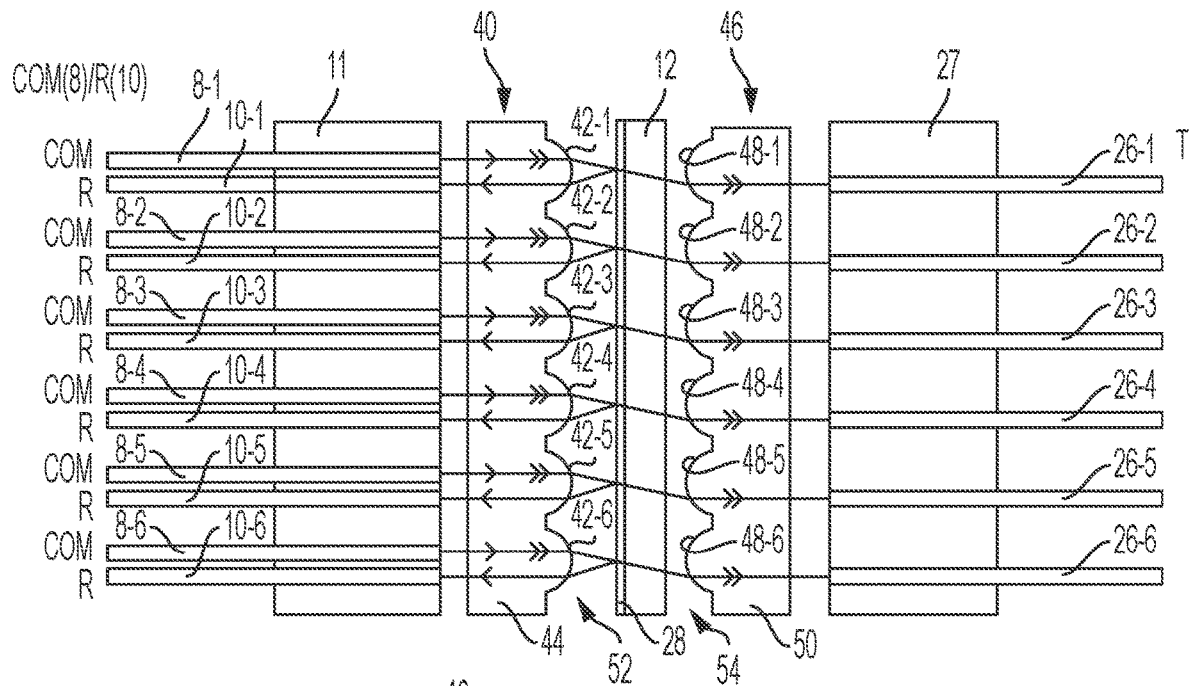
FIG. 4A is a schematic top view of an example WDM including a WDM filter between a pair of lens arrays, wherein each lens array includes a substrate having a number of spherical or aspherical lenses, and illustrating how light at first and second wavelengths propagate from a common (COM) optical fiber to a reflected (R) optical fiber and a transmit (T) optical fiber.
Figure 4B:
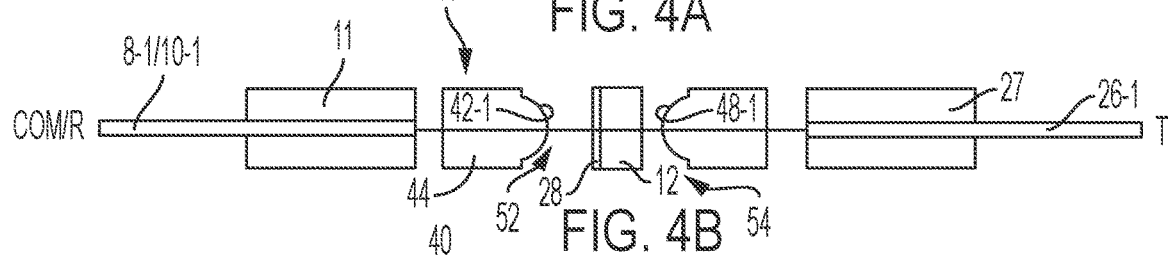
FIG. 4B is an end view of the WDM of FIG. 4A.
Figure 4C:
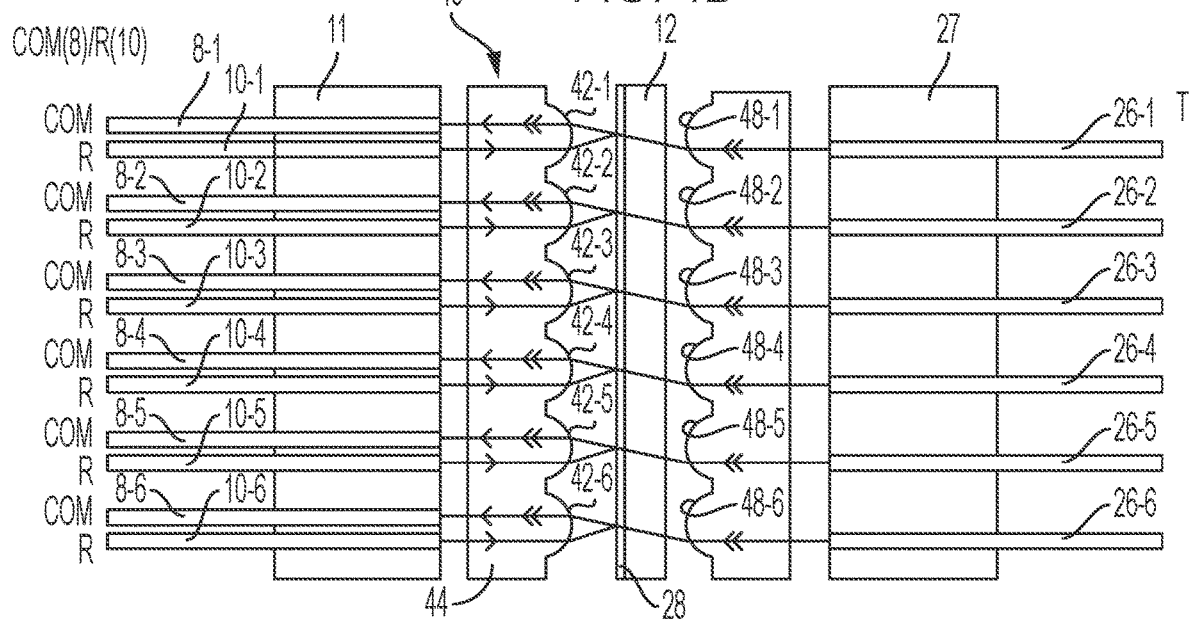
FIG. 4C is the schematic top view of the example WDM of FIG. 4A illustrating how light at first and second wavelengths propagate from the reflected (R) optical fiber and the transmit (T) optical fiber to the common (COM) optical fiber.

With reference to FIGS. 4A-4C, in some non-limiting embodiments or examples, a WDM in accordance with the principles of the present disclosure may be similar to the WDM of FIGS. 3A-3C with the following exception. In FIGS. 3A-3C, the reflected optical fibers 10-1-10-6 are positioned below the common optical fibers 8-1-8-6, as shown best in FIGS. 3B-3C. In contrast, in FIGS. 4A-4C, the reflected optical fibers 10-1-10-6 are positioned in-line or in the same plane as the common optical fibers 8-1-8-6, as shown best in FIGS. 4A and 4C. In the example shown in FIGS. 4A-4C, like the example shown in FIGS. 3A-3C, each spherical or aspherical lens 42 of the first lens array 40 has associated therewith a common-reflected optical fiber set, e.g., 8-1 and 10-1, consisting of a single common optical fiber and a single reflected optical fiber.

Since, other than the foregoing difference in the arrangement of the common and reflected optical fibers 8 and 10, the WDMs of FIGS. 3A-3C and FIGS. 4A-4C are similar and operate in the same manner, the use or operation of the WDM of FIGS. 4A-4C will not be described herein to for the purpose of simplicity.

Figure 5A:
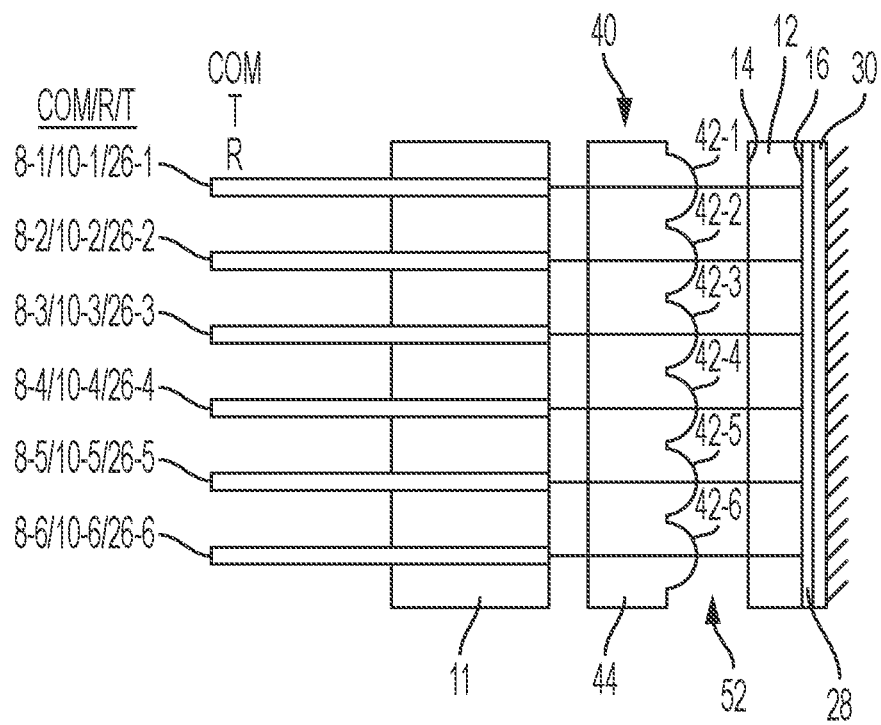
FIG. 5A is a schematic top view of an example WDM including a WDM filter between a lens arrays and a mirror, wherein the lens array includes a substrate having a number of spherical or aspherical lenses.
Figure 5B:
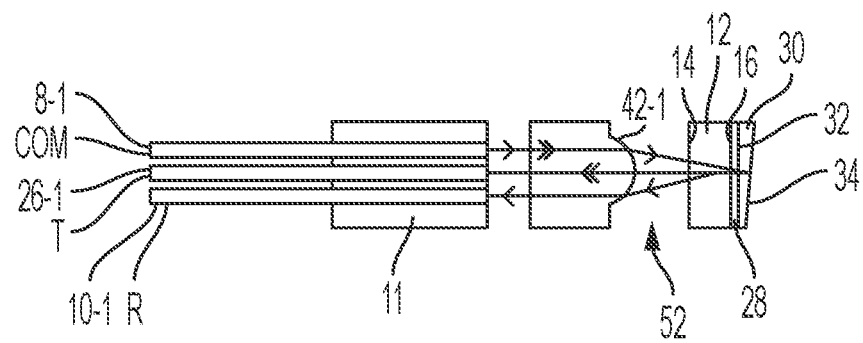
FIG. 5B is a schematic end view of the WDM of FIG. 5A illustrating how light at first and second wavelengths propagate from a common (COM) optical fiber to a reflected (R) optical fiber and a transmit (T) optical fiber.
Figure 5C:
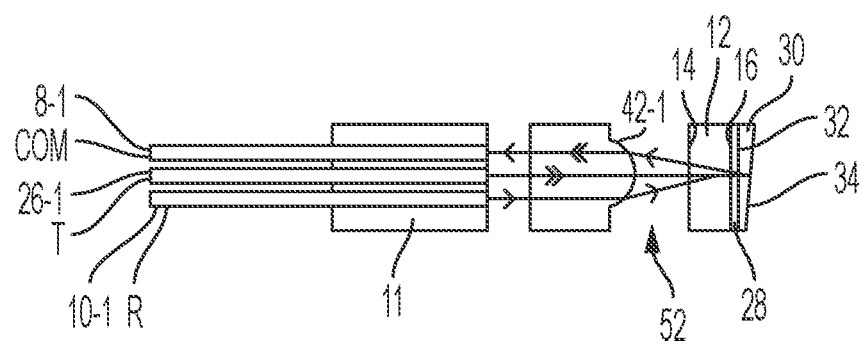
FIG. 5C is the schematic end view of the WDM of FIG. 5A illustrating how light at first and second wavelengths propagate from the reflected (R) optical fiber and the transmit (T) optical fiber to the common (COM) optical fiber.

With reference to FIGS. 5A-5C, in some non-limiting embodiments or examples, a WDM in accordance with the principles of the present disclosure may include a WDM filter 12 having a first surface 14 and a second surface 16 on opposite sides or ends of the WDM filter 12. The second surface 16 of the WDM filter may include a film or coating 28, in the nature of a diffraction grating. A lens array 40 comprising a first substrate 44 including a plurality of spherical or aspherical lenses 42 may be positioned on a first side of the WDM filter 12 spaced from the first surface 14 of the WDM filter 12 by a gap 52. The length of gap 52 may be selected as needed to facilitate the operation of the WDM of FIGS. 5A-5C in the manner described hereinafter. The spherical or aspherical lenses of the lens arrays 40 are positioned with rounded, spherical or aspherical surfaces of the spherical or aspherical lenses 42 facing the WDM filter 12.

In an example, a mirror 30 has a first, non-reflective surface or side 32 coupled to the second surface 16 of the WDM filter 12 with the film or coating 28 positioned between a body of the WDM filter 12 and a body of the mirror 30. A second, reflective, side or surface 34 of mirror 30 may be positioned on a side of the first surface 32 of mirror 30 opposite WDM filter 12 at an angle with respect to the first surface 32 of mirror 30. In an example, mirror 30 may be a wedge mirror, i.e., in the shape of a wedge, as shown best in FIGS. 5B-5C.

A first plurality or array of common optical fibers 8 are each positioned to input light into one spherical or aspherical lens 42 of lens array 40 and to receive light from the one spherical or aspherical lens 42 of the first lens array 40. A second plurality or array of reflected optical fibers 10 are each positioned to input light into one spherical or aspherical lens 42 of the first lens array 40 and to receive light from the one spherical or aspherical lens 42 of the first lens array 40. A third plurality or array of transmit optical fibers 26 are each positioned to input light into one spherical or aspherical lens 42 of the first lens array 40 and to receive light from the one spherical or aspherical lens 42 of the first lens array 40. As can be seen, each spherical or aspherical lens 42 is associated with, related to, or corresponds to a unique common—reflected—transmit optical fiber set (e.g., 8-1, 10-1, 26-1), each of which optical fiber of said unique optical fiber set is positioned to input light into and receive light from the associated, related, or corresponding spherical or aspherical lens (e.g., lens 42-1).

A connector 11 supporting the common, reflected, and transmit optical fibers 8, 10 and 26 in operative relation to lens array 40 may be spaced from or coupled to a side of the first substrate 44 opposite the plurality of spherical or aspherical lenses 42.

In an example, the common, reflected and transmit optical fibers 8, 10, and 26 are positioned to input and receive light from each spherical or aspherical lens 42 as follows:

| Common Optical Fiber | Reflected Optical Fiber | Transmit Optical Fiber | Spherical or Aspherical-lens |
|---|---|---|---|
| 8-1 | 10-1 | 26-1 | 42-1; |
| 8-2 | 10-2 | 26-2 | 42-2; |
| 8-3 | 10-3 | 26-3 | 42-3; |
| 8-4 | 10-4 | 26-4 | 42-4; |
| 8-5 | 10-5 | 26-5 | 42-5; and |
| 8-6 | 10-6 | 26-6 | 42-6. |

The example WDM of FIGS. 5A-5C includes six common optical fibers 8-1-8-6, six reflected optical fibers 10-1-10-6, six transmit optical fibers 26-1-26-6, and six spherical or aspherical lenses 42. However, this is not to be construed in a limiting sense since the number of optical fibers 8, 10, and/or 26 of each array and the number of spherical or aspherical lenses 42 may include any number deemed suitable and/or desirable for a particular application. In FIG. 5A, the reflected optical fibers 10-1-10-6 are positioned below the transmit optical fibers 26-1-26-6 which, in-turn, are positioned below the common optical fibers 8-1-8-6, as shown best in FIGS. 5B-5C, for the purpose of illustration and not of limitation.

Moreover, the illustration of spherical or aspherical lenses 42 being a linear array is not to be construed in a limiting sense since it is envisioned that spherical or aspherical lenses 42 can be arrayed in any suitable and/or desirable manner for a particular application.

The use or operation of the WDM of FIGS. 5A-5C will now be described with reference to related, associated or corresponding optical fibers 8, 10, and 26 and related, associated or corresponding spherical or aspherical lenses 42. In FIGS. 5A-5C related, associated or corresponding optical fibers and related, associated or corresponding spherical or aspherical lenses are denoted by the same numerical suffix, e.g., -1, -2, -3, -4, etc.

In use or operation of the WDM of FIGS. 5A-5C, light having first and second wavelengths output by each common optical fiber 8 propagates through one spherical or aspherical lens 42 to the WDM filter 12 where the film or coating 28: (1) reflects the light of the first wavelength back through the one spherical or aspherical lens 42 to the reflected optical fiber 10 positioned to receive light from the one spherical or aspherical lens 42 but to no other optical fiber of the array of reflected optical fibers, the array of transmit optical fibers, and the array of common optical fibers, and (2) passes to the mirror 30 the light of the second wavelength which passes through the first surface 32 and the body of mirror 30 to the reflective surface 34 which reflects the light of the second wavelength back through the body and the first surface 32 of mirror 30, the WDM filter 12, including the film or coating 28, and the one spherical or aspherical lens 42 to the transmit optical fiber 26 positioned to receive light from the one spherical or aspherical lens 42 but to no other optical fiber of the array of reflected optical fibers, the array of transmit optical fibers, and the array of common optical fibers.

In an example shown in FIG. 5B, light at the first wavelength (shown by single arrow heads ">") output by common optical fiber 8-1 propagates through spherical or aspherical lens 42-1 to the WDM filter 12 where the film or coating 28 reflects the light of the first wavelength back through spherical or aspherical lens 42-1 to the reflected optical fiber 10-1. As is also shown in FIG. 5B, light at the second wavelength (shown by double arrow heads ">>") output by common optical fiber 8-1 propagates through the spherical or aspherical lens 42-1, the WDM filter 12, including the film or coating 28, and the body of mirror 30 for reflection by the reflective surface 34 of mirror 30 back through the body of mirror 30, the WDM filter 12, including the film or coating 28, and the spherical or aspherical lens 42-1 to the transmit optical fiber 26-1.

In a reciprocal manner shown in FIG. 5C, light at the first wavelength (shown by single arrow heads ">") output by the reflected optical fiber 10-1 propagates through spherical or aspherical lens 42-1 and is reflected by the film or coating 28 of the WDM filter 12 back through spherical or aspherical lens 42-1 to common optical fiber 8-1. Also, light at the second wavelength (shown by double arrow heads ">") output by transmit optical fiber 26-1 propagates through spherical or aspherical lens 42-1, the WDM filter 12, including the film or coating 28, and the body of mirror 30 for reflection by the reflective surface 34 of mirror 30 back through the body of mirror 30, the WDM filter 12, including the film or coating 28, and the spherical or aspherical lens 42-1 to common optical fiber 8-1.

In an example, spherical or aspherical lenses 42 and WDM filter 12, including the film or coating 28, are configured to direct light at the first wavelength (shown by single arrow heads ">") in either direction between related, associated or corresponding common optical fiber 8 and reflected optical fiber 10 as follows:

First Wavelength:
 common optical fiber 8-1/reflected optical fiber 10-1/ spherical or aspherical lens 42-1;
 common optical fiber 8-2/reflected optical fiber 10-2/ spherical or aspherical lens 42-2;
 common optical fiber 8-3/reflected optical fiber 10-3/ spherical or aspherical lens 42-3;
 common optical fiber 8-4/reflected optical fiber 10-4/ spherical or aspherical lens 42-4
 common optical fiber 8-5/reflected optical fiber 10-5/ spherical or aspherical lens 42-5; and
 common optical fiber 8-6/reflected optical fiber 10-6/ spherical or aspherical lens 42-6.

In an example, spherical or aspherical lenses 42, WDM filter 12, including the film or coating 28, and mirror 30 are configured to direct light at the second wavelength (shown by double arrow heads ">>") in either direction between related, associated or corresponding common optical fibers 8 and transmit optical fibers 26 as follows:

Second Wavelength
 common optical fiber 8-1/transmit optical fiber 26-1/ spherical or aspherical lens 42-1;
 common optical fiber 8-2/transmit optical fiber 26-2/ spherical or aspherical lens 42-2;
 common optical fiber 8-3/transmit optical fiber 26-3/ spherical or aspherical lens 42-3;
 common optical fiber 8-4/transmit optical fiber 26-4/ spherical or aspherical lens 42-4;
 common optical fiber 8-5/transmit optical fiber 26-5/ spherical or aspherical lens 42-5; and common optical fiber 8-6/transmit optical fiber 26-6/spherical or aspherical lens 42-6.

In an example, the WDM filter 12 may be comprised of a flat surface glass including the film or coating 28, in the nature of a diffraction grating, that reflects the light of the first wavelength and passes the light of the second wavelength.

Figure 6A:
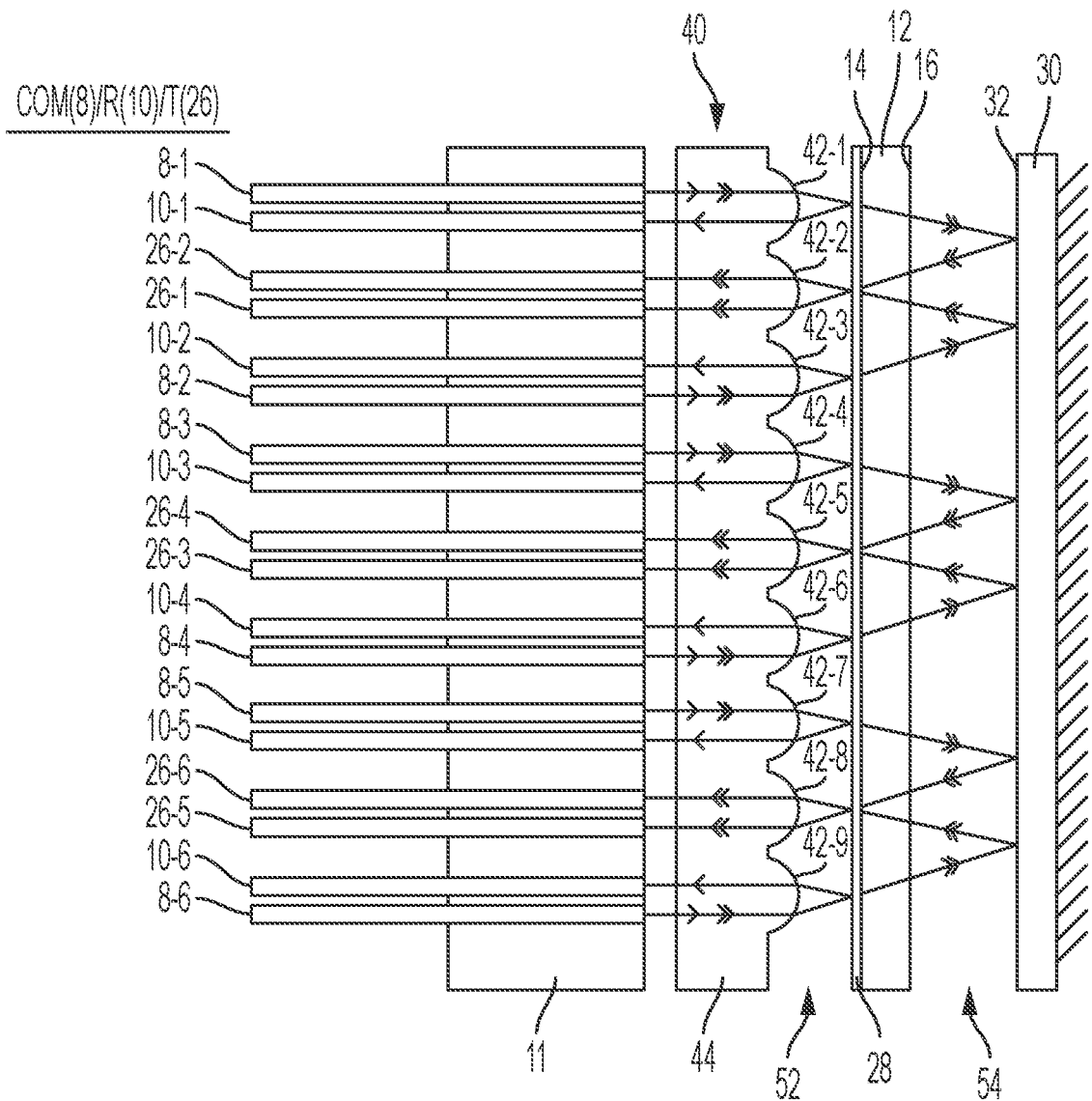
FIG. 6A is a schematic top view of an example WDM including a WDM filter between a lens array and a mirror, wherein the lens array includes a substrate having a number of spherical or aspherical lenses, and illustrating how light at first and second wavelengths propagate from each common (COM) optical fiber to related, associated or corresponding reflected (R) and transmit (T) optical fibers.
Figure 6B:
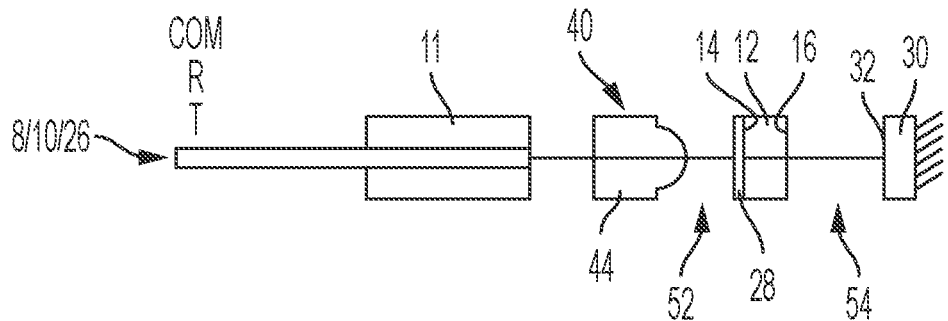
FIG. 6B is a schematic end view of the WDM of FIG. 6A.
Figure 6C:
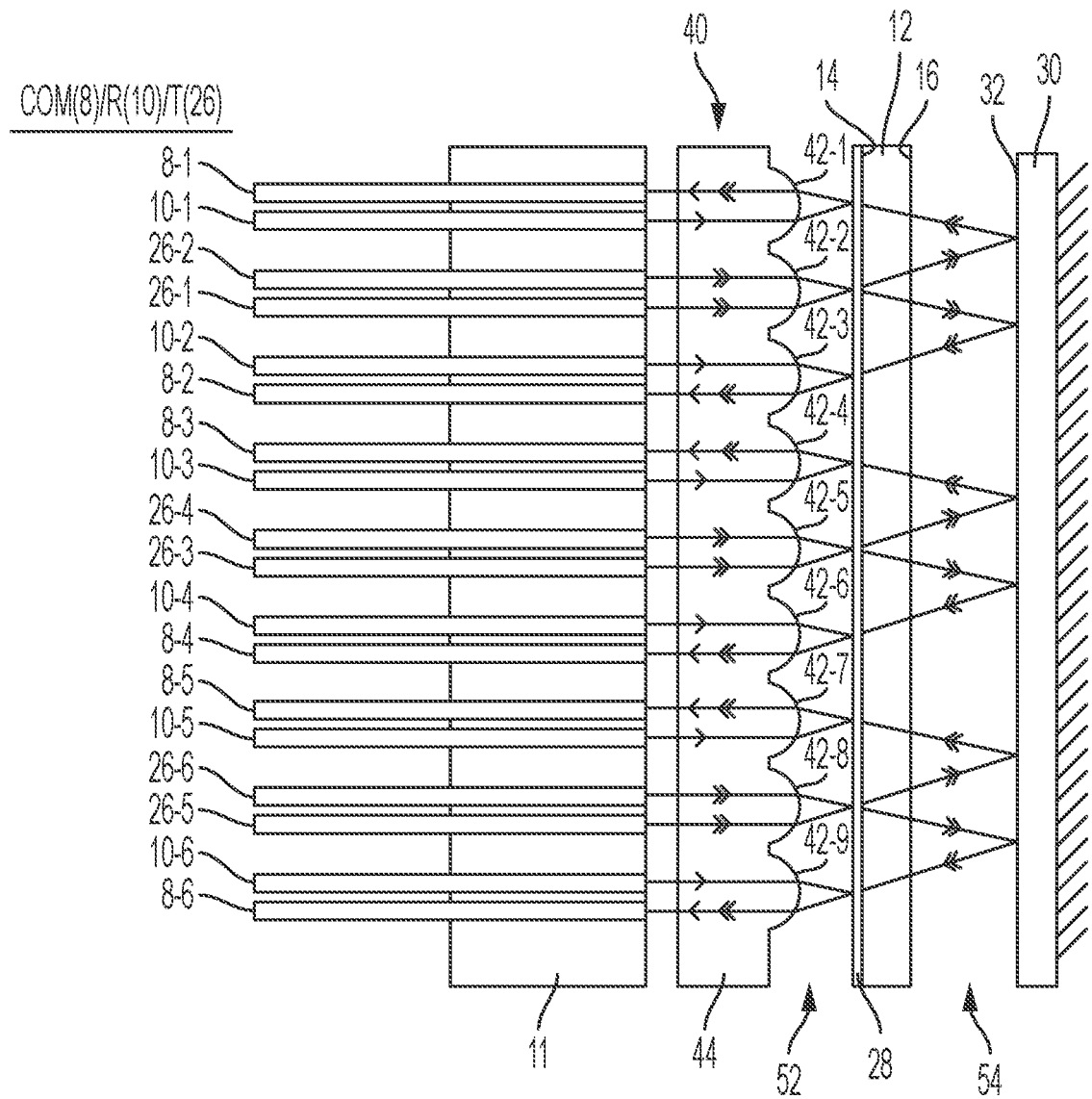
FIG. 6C is the schematic top view of the example WDM of FIG. 6A illustrating how light at first and second wavelengths propagate from reflected (R) and transmit (T) optical fibers to a related, associated or corresponding common (COM) optical fiber.

With reference to FIGS. 6A-6C, in some non-limiting embodiments or examples, a WDM in accordance with the principles of the present disclosure may include a WDM filter 12 having a first surface 14 and a second surface 16 on opposite sides or ends of the WDM filter 12. The first surface 14 of the WDM filter may include a film or coating 28, in the nature of a diffraction grating. A lens array 40 comprising a substrate 44 including a plurality of spherical or aspherical lenses 42 may be positioned on a first side of the WDM filter 12 spaced from the film or coating 28 by a gap 52. The length of gap 52 may be selected as needed to facilitate the operation of the WDM of FIGS. 6A-6C in the manner described hereinafter. The spherical or aspherical lenses of the lens arrays 40 are positioned with rounded, spherical or aspherical surfaces of the spherical or aspherical lenses 42 facing the WDM filter 12.

A mirror 30 has a first, reflective, surface or side 32 spaced from and facing the second surface 16 of the WDM filter 12 via a gap 54. The length of gap 54 may be selected as needed to facilitate the operation of the WDM of FIGS. 6A-6C in the manner described hereinafter. In an example, mirror 30 may be a flat mirror as shown best in FIGS. 6A and 6C.

A first plurality or array of common optical fibers 8 are each positioned to input light into one of a subset of the spherical or aspherical lens 42 of lens array 40 and to receive light from the one of the subset of spherical or aspherical lens 42 of the first lens array 40. A second plurality or array of reflected optical fibers 10 are each positioned to input light into one of a subset of spherical or aspherical lens 42 of the first lens array 40 and to receive light from the one of the subset of spherical or aspherical lens 42 of the first lens array 40. A third plurality or array of transmit optical fibers 26 are each positioned to input light into one of a subset of spherical or aspherical lens 42 of the first lens array 40 and to receive light from the one of the subset of spherical or aspherical lens 42 of the first lens array 40.

More specifically, each spherical or aspherical lens 42 of a first subset of the spherical or aspherical lenses has associated therewith a unique common—reflected optical fiber pair 8, 10, each of which optical fiber of said unique optical fiber pair is positioned to input light into said spherical or aspherical lens of the first subset of the spherical or aspherical lenses and to receive light from said spherical or aspherical lens of the first subset of the spherical or aspherical lenses. Moreover, each spherical or aspherical lens 42 of a second subset of the spherical or aspherical lenses has associated therewith two unique transmit optical fiber 26 positioned to input light into the spherical or aspherical lens of the second subset of the spherical or aspherical lenses and to receive light from the spherical or aspherical lens of the second subset of the spherical or aspherical lenses.

A connector 11 supporting the common, reflected, and transmit optical fibers 8, 10 and 26 in operative relation to lens array 40 may be spaced from or coupled to a side of the substrate 44 opposite the plurality of spherical or aspherical lenses 42.

In the example of FIGS. 6A-6C, the common, reflected and transmit optical fibers 8, 10, and 26 are positioned to input and receive light from each spherical or aspherical lens 42 as follows:

| Common Optical Fiber | Reflected Optical Fiber | Transmit Optical Fibers | Spherical or Aspherical-lens |
|---|---|---|---|
| 8-1 | 10-1 | — | 42-1; |
| — | — | 26-1/26-2 | 42-2; |
| 8-2 | 10-2 | — | 42-3; |
| 8-3 | 10-3 | — | 42-4; |
| — | — | 26-3/26-4 | 42-5; |
| 8-4 | 10-4 | — | 42-6; |
| 8-5 | 10-5 | — | 42-7; |
| — | — | 26-5/26-6 | 42-8; and |
| 8-6 | 10-6 | — | 42-9. |

In this example, the first subset of the spherical or aspherical lenses includes spherical or aspherical lenses 42-1, 42-3, 42-4, 42-6, 42-7, and 42-9. The second subset of the spherical or aspherical lenses includes spherical or aspherical lenses 42-2, 42-5, 42-8. However, this is not to be construed in a limiting sense since it is envisioned since each subset of spherical or aspherical lenses may include any combination of spherical or aspherical lenses deemed suitable and/or desirable for a particular application or design of the WDM of FIGS. 6A-6C.

The example WDM of FIGS. 6A-6C includes six common optical fibers 8-1-8-6, six reflected optical fibers 10-1-10-6, six transmit optical fibers 26-1-26-6, and nine spherical or aspherical lenses 42-1-42-9. However, this is not to be construed in a limiting sense since the number of optical fibers 8, 10, and/or 26 of each array and the number of spherical or aspherical lenses 42 may include any number deemed suitable and/or desirable for a particular application or design of the WDM. FIGS. 6A and 6C, the common, reflected, and transmit optical fibers 8, 10, 26 are positioned in-line or in the same plane. However, this is not to be construed in a limiting sense since the common, reflected, and transmit optical fibers 8, 10, 26 may be arranged in any suitable and/or desirable arrangement for a particular application or design of the WDM. Moreover, the illustration of spherical or aspherical lenses 42 being a linear array is not to be construed in a limiting sense since it is envisioned that spherical or aspherical lenses 42 can be arrayed in any suitable and/or desirable manner for a particular application or design of the WDM.

The use or operation of the WDM of FIGS. 6A-6C will now be described with reference to related, associated or corresponding optical fibers 8, 10, and 26 and related, associated or corresponding spherical or aspherical lenses 42. In FIGS. 6A-6C related, associated or corresponding optical fibers and related, associated or corresponding spherical or aspherical lenses are denoted by the same numerical suffix, e.g., -1, -2, -3, -4, etc.

In use or operation of the WDM of FIGS. 6A-6C, light at first and second wavelengths output by each common optical fiber 8 propagates through one spherical or aspherical lens 42 to the WDM filter 12 where the film or coating 28: (1) reflects the light of the first wavelength back through the one spherical or aspherical lens 42 to the reflected optical fiber 10 positioned to receive light from the one spherical or aspherical lens 42 but to no other optical fiber of the array of reflected optical fibers, the array of transmit optical fibers, and the array of common optical fibers, and (2) passes to the mirror 30 the light of the second wavelength which is reflected by the reflective surface 32 back through the WDM filter 12 and through another spherical or aspherical lens 42 to the transmit optical fiber 26 positioned to receive light from the other spherical or aspherical lens 42 but to no other optical fiber of the array of reflected optical fibers, the array of transmit optical fibers, and the array of common optical fibers.

In an example shown in FIG. 6A, light at the first wavelength (shown by single arrow heads ">") output by common optical fiber 8-1 propagates through spherical or aspherical lens 42-1 to the WDM filter 12 where the film or coating 28 reflects the light of the first wavelength back through spherical or aspherical lens 42-1 to the reflected optical fiber 10-1. As is also shown in FIG. 6A, light at the second wavelength (shown by double arrow heads ">>") output by common optical fiber 8-1 propagates through the spherical or aspherical lens 42-1, the WDM filter 12, including the film or coating 28, for reflection by the reflective surface 32 of mirror 30 back through the WDM filter 12, including the film or coating 28, and the spherical or aspherical lens 42-2 to the transmit optical fiber 26-1.

In a reciprocal manner shown in FIG. 6C, light at the first wavelength (shown by single arrow heads ">") output by the reflected optical fiber 10-1 propagates through spherical or aspherical lens 42-1 and is reflected by the film or coating 28 of the WDM filter 12 back through spherical or aspherical lens 42-1 to common optical fiber 8-1. Also, light at the second wavelength (shown by double arrow heads ">>") output by transmit optical fiber 26-1 propagates through spherical or aspherical lens 42-2 and WDM filter 12, including the film or coating 28, for reflection by the reflective surface 32 of mirror 30 back through the WDM filter 12, including the film or coating 28, and the spherical or aspherical lens 42-1 to common optical fiber 8-1.

In an example, spherical or aspherical lenses 42 and WDM filter 12, including the film or coating 28, are configured to direct light at the first wavelength (shown by single arrow heads ">") in either direction between related, associated or corresponding common optical fiber 8 and reflected optical fiber 10 as follows:

First Wavelength:
common optical fiber 8-1/reflected optical fiber 10-1/ spherical or aspherical lens 42-1;
common optical fiber 8-2/reflected optical fiber 10-2/ spherical or aspherical lens 42-3;
common optical fiber 8-3/reflected optical fiber 10-3/ spherical or aspherical lens 42-4;
common optical fiber 8-4/reflected optical fiber 10-4/ spherical or aspherical lens 42-6;
common optical fiber 8-5/reflected optical fiber 10-5/ spherical or aspherical lens 42-7; and
common optical fiber 8-6/reflected optical fiber 10-6/ spherical or aspherical lens 42-9.

In an example, spherical or aspherical lenses 42, WDM filter 12, including the film or coating 28, and mirror 30 are configured to direct light at the second wavelength (shown by double arrow heads ">>") in either direction between related, associated or corresponding common optical fibers 8 and transmit optical fibers 26 as follows:

Second Wavelength
common optical fiber 8-1/transmit optical fiber 26-1/ spherical or aspherical lenses 42-1 and 42-2;
common optical fiber 8-2/transmit optical fiber 26-2/ spherical or aspherical lenses 42-2 and 42-3;
common optical fiber 8-3/transmit optical fiber 26-3/ spherical or aspherical lenses 42-4 and 42-5;
common optical fiber 8-4/transmit optical fiber 26-4/ spherical or aspherical lenses 42-5 and 42-6;
common optical fiber 8-5/transmit optical fiber 26-5/ spherical or aspherical lenses 42-7 and 42-8; and
common optical fiber 8-6/transmit optical fiber 26-6/ spherical or aspherical lenses 42-8 and 42-9.

In an example, the WDM filter 12 may be comprised of a flat surface glass including the film or coating 28, in the nature of a diffraction grating, that reflects the light of the first wavelength and passes the light of the second wavelength.

In some non-limiting embodiments or examples, each of the first substrate 44 including the plurality of spherical or aspherical lenses 42 and/or the second substrate 50 including the plurality of spherical or aspherical lenses 48 may be formed as integral piece by, for example, etching. However, this is not to be construed in a limiting sense since it is envisioned that each substrate 44 and/or 50 and its plurality of spherical or aspherical lenses may be formed in any manner deemed suitable and/or desirable to facilitate the use or operation of the any of the WDMs shown in FIGS. 3A-3C, 4A-4C, 5A-5C, and/or 6A-6C in the manners described above.

Figure 7:
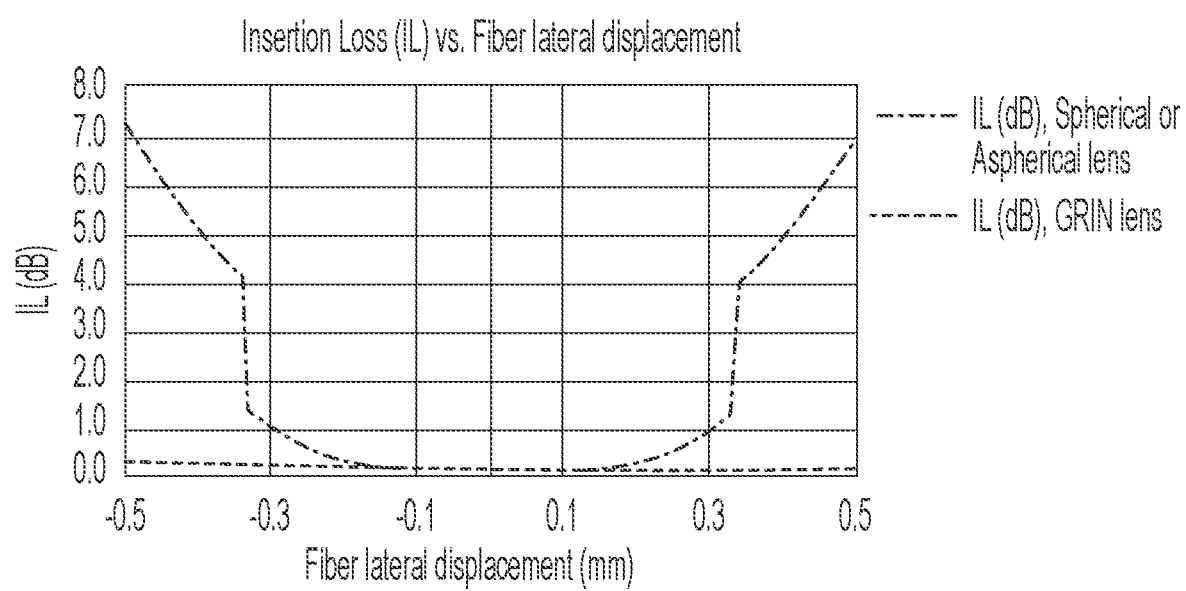
FIG. 7 is a graph of insertion loss (IL) versus optical fiber lateral displacement for a GRIN lens and a spherical or aspherical lens.

With reference to FIG. 7, a plot of insertion loss (IL) versus optical fiber lateral displacement with respect to a GRIN lens and a spherical or aspherical lens shows that a GRIN lens is more tolerant of optical fiber lateral displacement than a spherical or aspherical lens. This means that during the design and assembly of WDMs that use spherical or aspherical lenses, it is more important that the optical axis of each optical fiber is more aligned with, and has less lateral displacement to, a spherical or aspherical lens than in the design and assembly of WDMs that use GRIN lens(es).

In each of the foregoing example WDMs, one or more end surfaces of at least one of the optical fibers and the surface of a GRIN lens (FIGS. 1A-2C) or the surface of substrate 44 and/or 50 of lens array 40 and/or 46 opposite spherical or aspherical lens 42 and/or 48 (FIGS. 3A-6C) may be positioned, as needed, at an angle relative to a cross-section of the WDM to avoid light reflection. In an example, this angle may be between 5 and 10 degrees.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:
1. A wavelength division multiplexer (WDM) comprising:
a first gradient-index (GRIN-1) lens including first and second surfaces on opposite sides or ends of the GRIN-1 lens;
a first plurality or array of common optical fibers, each positioned to input light into the first surface of the GRIN-1 lens and to receive light from the first surface of the GRIN-1 lens;
a second plurality or array of reflected optical fibers, each positioned to input light into the first surface of the GRIN-1 lens and to receive light from the first surface of the GRIN-1 lens;

a WDM filter including first and second surfaces on opposite sides or ends of the WDM filter, the first surface of the WDM filter coupled to the second surface of the GRIN-1 lens;

a second gradient-index (GRIN-2) lens including first and second surfaces on opposite sides or ends of the GRIN-2 lens, wherein the first surface of the GRIN-2 lens and the second surface of the WDM filter are spaced from each other by a gap; and a third plurality or array of transmit optical fibers, each positioned to input light into the second surface of the GRIN-2 lens and to receive light from the second surface of the GRIN-2 lens, wherein:

light having first and second wavelengths output by each common optical fiber propagates through the GRIN-1 lens to the WDM filter which:

(1) reflects the light of the first wavelength back through the GRIN-1 lens to a unique one of the reflected optical fibers but to no other optical fiber of the array of reflected optical fibers, the array of transmit optical fibers, and the array of common optical fibers; and (2) passes the light of the second wavelength through the gap and the GRIN-2 lens to a unique one of the transmit optical fibers but to no other optical fiber of the array of transmit optical fibers, the array of reflected optical fibers, and the array of common optical fibers.

2. The WDM of claim 1, wherein, for light at the first wavelength, there is a one-to-one correspondence between each common optical fiber and the unique one of the reflected optical fibers.

3. The WDM of claim 2, wherein light at the first wavelength output by the unique one of the reflected optical fibers propagates through the GRIN-1 lens and is reflected by the WDM filter to the common optical fiber having the one-to-one correspondence with the unique one of the reflected optical fibers.

4. The WDM of claim 1, wherein, for light at the second wavelength, there is a one-to-one correspondence between each common optical fiber and the unique one of the transmit optical fibers.

5. The WDM of claim 4, wherein light at the second wavelength output by the unique one of the transmit optical fibers propagates through the GRIN-2 lens, the gap, the WDM filter, and the GRIN-1 lens to the common optical fiber having the one-to-one correspondence with the unique one of the transmit optical fibers.

6. The WDM of claim 1, wherein the WDM filter is comprised of a flat surface glass including a film or coating that reflects the light of the first wavelength and passes the light of the second wavelength.

7. The WDM of claim 1, wherein one or more of sides or end surfaces of at least one of the optical fibers, the first surface of the GRIN-1 lens and the second surface of the GRIN-2 lens is positioned at an angle relative to a cross-section of the WDM to avoid light reflection.

8. The WDM of claim 7, wherein the angle is between 5 and 10 degrees.

9. The WDM of claim 6, wherein a length of the gap is between 1-10 mm or between 2-3 mm.

10. A wavelength division multiplexer (WDM) comprising:

a gradient-index (GRIN) lens including first and second surfaces on opposite sides or ends of the GRIN lens;

a first plurality or array of common optical fibers, each positioned to input light into the first surface of the GRIN lens and to receive light from the first surface of the GRIN lens;

a second plurality or array of reflected optical fibers, each positioned to input light into the first surface of the GRIN lens and to receive light from the first surface of the GRIN lens;

a third plurality or array of transmit optical fibers, each positioned to input light into the first surface of the GRIN lens and to receive light from the first surface of the GRIN lens;

a WDM filter including first and second surfaces on opposite sides or ends of the WDM filter, the first surface of the WDM filter coupled to the second surface of the GRIN lens; and a mirror coupled to the second surface of the WDM filter, wherein:

light having first and second wavelengths output by each common optical fiber propagates through the GRIN lens to the WDM filter which:

(1) reflects the light of the first wavelength back through the GRIN lens to a unique one of the reflected optical fibers but to no other optical fiber of the array of reflected optical fibers, the array of transmit optical fibers, and the array of common optical fibers, and (2) passes the light of the second wavelength to the mirror which reflects the light of the second wavelength back through the WDM filter and the GRIN lens to a unique one of the transmit optical fibers but to no other optical fiber of the array of transmit optical fibers, the array of reflected optical fibers, and the array of common optical fibers.

11. The WDM of claim 10, wherein, for light at the first wavelength, there is a one-to-one correspondence between each common optical fiber and the unique one of the reflected optical fibers.

12. The WDM of claim 11, wherein light at the first wavelength output by the unique one of the reflected optical fibers propagates through the GRIN lens and is reflected by the WDM filter back through the GRIN lens to the common optical fiber having the one-to-one correspondence with the unique one of the reflected optical fibers.

13. The WDM of claim 10, wherein, for light at the second wavelength, there is a one-to-one correspondence between each common optical fiber and the unique one of the transmit optical fibers.

14. The WDM of claim 13, wherein light at the second wavelength output by the unique one of the transmit optical fibers propagates through the GRIN lens and the WDM filter and is reflected by the mirror back through the WDM filter and the GRIN lens to the common optical fiber having the one-to-one correspondence with the unique one of the transmit optical fibers.

15. The WDM of claim 10, wherein the mirror is a wedge mirror having a reflective surface positioned at an angle to the second surface of the WDM filter.

16. The WDM of claim 15, wherein the end surface at least one optical fiber and the first surface of the GRIN lens is positioned at an angle relative to a cross-section of the WDM to avoid light reflection.

17. The WDM of claim 16, wherein the angle is between 5 and 10 degrees.

18. A wavelength division multiplexer (WDM) comprising:

a WDM filter;

a first lens array including a first substrate including plurality of spherical or aspherical lenses positioned on a first side of the WDM filter;

a second lens array including a second substrate including a plurality of spherical or aspherical lenses positioned on a second side of the WDM filter, wherein each spherical or aspherical lens of the first and second lens arrays includes a rounded, spherical or aspherical surface facing the WDM filter;

a first plurality or array of common optical fibers, each positioned to input light into one spherical or aspherical lens of the first lens array and to receive light from the one spherical or aspherical lens of the first lens array;

a second plurality or array of reflected optical fibers, each positioned to input light into one spherical or aspherical lens of the first lens array and to receive light from the one spherical or aspherical lens of the first lens array; and a third plurality or array of transmit optical fibers, each positioned to input light into one spherical or aspherical lens of the second lens array and to receive light from the one spherical or aspherical lens of the second lens array, wherein:

light having first and second wavelengths output by each common optical fiber propagates through one spherical or aspherical lens of the first lens array to the WDM filter which:

(1) reflects the light of the first wavelength back through the one spherical or aspherical lens of the first lens array to the reflected optical fiber positioned to receive light from the one spherical or aspherical lens of the first lens array but to no other optical fiber of the array of reflected optical fibers, the array of transmit optical fibers, and the array of common optical fibers, and (2) passes the light of the second wavelength through one spherical or aspherical lens of the second lens array to a unique one of the transmit optical fibers but to no other optical fiber of the array of transmit optical fibers, the array of reflected optical fibers, and the array of common optical fibers.

19. The WDM of claim 18, wherein, for light at the first wavelength, there is a one-to-one correspondence between each common optical fiber positioned to input light into the one spherical or aspherical lens of the first lens array and the reflected optical fiber positioned to receive light from the one spherical or aspherical lens of the first lens array.

20. The WDM of claim 19, wherein light at the first wavelength output by the reflected optical fiber propagates through the one spherical or aspherical lens of the first lens array and is reflected by the WDM filter back through the one spherical or aspherical lens of the first lens array to the common optical fiber having the one-to-one correspondence with the reflected optical fiber.

21. The WDM of claim 18, wherein, for light at the second wavelength, there is a one-to-one correspondence between each common optical fiber positioned to input light into the one spherical or aspherical lens of the first lens array and one of the transmit optical fibers positioned to receive light from the one spherical or aspherical lens of the second lens array.

22. The WDM of claim 21, wherein light at the second wavelength output by the unique one of the transmit optical fibers propagates through the one spherical or aspherical lens of the second lens array, the WDM filter, and the one spherical or aspherical lens of the first lens array to the common optical fiber having the one-to-one correspondence with the transmit optical fiber.

23. The WDM of claim 18, further including a gap or space between at least one of the following:
the first lens array and the WDM filter;
the second lens array and the WDM filter;
the first lens array and the first plurality or array of common optical fibers and the second plurality or array of reflected optical fibers; and
the second lens array and the third plurality or array of transmit optical fibers.

24. The WDM of claim 18, wherein the array of common optical fibers and the array of reflected optical fibers are aligned in a plane and each spherical or aspherical lens of the first lens array has associated therewith a common-reflected optical fiber set consisting of a single common optical fiber and a single reflected optical fiber.

25. A wavelength division multiplexer (WDM) comprising:

a WDM filter;

an optical fiber array including a first plurality or array of common optical fibers, a second plurality or array of reflected optical fibers, and a third plurality or array of transmit optical fibers, a lens array including a substrate including plurality of spherical or aspherical lenses positioned on a first side of the WDM filter, wherein each spherical or aspherical lens includes a rounded, spherical or aspherical surface facing the WDM filter, wherein:

each spherical or aspherical lens of a first subset of the spherical or aspherical lenses has associated therewith a unique common-reflected optical fiber pair, each of which optical fiber of said unique optical fiber pair is positioned to input light into the spherical or aspherical lens of the first subset of the spherical or aspherical lenses and to receive light from the spherical or aspherical lens of the first subset of the spherical or aspherical lenses; and each spherical or aspherical lens of a second subset of the spherical or aspherical lenses has associated therewith at least one unique transmit optical fiber positioned to input light into the spherical or aspherical lens of the second subset of the spherical or aspherical lenses and to receive light from the spherical or aspherical lens of the second subset of the spherical or aspherical lenses; and a mirror positioned on a second side of the WDM filter, wherein:

light having first and second wavelengths output by each common optical fiber propagates through one spherical or aspherical lens of the first subset of spherical or aspherical lenses to the WDM filter which:

(1) reflects the light of the first wavelength back through the one spherical or aspherical lens of the first subset of spherical or aspherical lenses to the reflected optical fiber positioned to receive light from the one spherical or aspherical lens of the first subset of spherical or aspherical lenses but to no other optical fiber of the array of reflected optical fibers, the array of transmit optical fibers, and the array of common optical fibers, and (2) passes the light of the second wavelength to the mirror which reflects the light of the second wavelength back through the WDM filter to one spherical or aspherical lens of the second subset of spherical or aspherical lenses and to the unique transmit optical fiber positioned to receive light from the one spherical or aspherical lens of the second subset of the spherical or aspherical lenses but to no other optical fiber of the array of transmit optical fibers, the array of reflected optical fibers, and the array of common optical fibers.

26. The WDM of claim 25, wherein the first and second subset of spherical or aspherical lenses have no spherical or aspherical lens in common.

27. The WDM of claim 25, wherein light at the first wavelength output by the reflected optical fiber of a unique common-reflected optical fiber pair propagates through the associated one spherical or aspherical lens of the first subset of spherical or aspherical lenses and is reflected by the WDM filter back through the associated one spherical or aspherical lens of the subset of spherical or aspherical lenses to the common optical fiber of the unique common-reflected optical fiber pair.

28. The WDM of claim 25, wherein light at the second wavelength output by one of the transmit optical fibers propagates through the associated one spherical or aspherical lens of the second subset of spherical or aspherical lenses and the WDM filter and is reflected by the mirror back through the WDM filter to the one spherical or aspherical lens of the first subset of spherical or aspherical lenses and to the common optical fiber positioned to receive light from the one spherical or aspherical lens of the first subset of the spherical or aspherical lenses.

29. The WDM of claim 25, further including a gap or space between at least one of the following:
the lens array and the WDM filter;
the WDM filter and the mirror; and
the lens array and the optical fiber array.

30. The WDM of claim 25, further including a gap or space between at least one of the following:
the lens array and the WDM filter;
the WDM filter and the mirror; and
the lens array and the optical fiber array.

* * * * *

UNITED STATES PATENT AND TRADEMARK OFFICE
CERTIFICATE OF CORRECTION

PATENT NO. : 12,379,546 B2
APPLICATION NO. : 18/173259
DATED : August 5, 2025
INVENTOR(S) : Tingyu Xue et al.

It is certified that error appears in the above-identified patent and that said Letters Patent is hereby corrected as shown below:

In the Claims

Column 21, Line 62, Claim 9, delete "claim 6," and insert -- claim 1, --

Signed and Sealed this
Ninth Day of December, 2025

John A. Squires
*Director of the United States Patent and Trademark Office*